(12) United States Patent
Li et al.

(10) Patent No.: US 10,889,770 B2
(45) Date of Patent: *Jan. 12, 2021

(54) METHOD AND DEVICE FOR LIGHTENING HEAVY OIL BY UTILIZING A SUSPENSION-BED HYDROGENATION PROCESS

(71) Applicant: Beijing Huashi United Energy Technology and Development Co., Ltd., Beijing (CN)

(72) Inventors: Lin Li, Beijing (CN); Ke Lin, Beijing (CN); Guoliang Li, Beijing (CN); Erxuan He, Beijing (CN)

(73) Assignee: Beijing Huashi United Energy Technology and Development Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/855,233

(22) Filed: Dec. 27, 2017

(65) Prior Publication Data

US 2018/0187103 A1 Jul. 5, 2018

(30) Foreign Application Priority Data

Dec. 30, 2016 (CN) .......................... 2016 1 1255218
Dec. 30, 2016 (CN) .......................... 2016 1 1255247

(51) Int. Cl.
*C10G 67/12* (2006.01)
*C10G 67/02* (2006.01)
(Continued)

(52) U.S. Cl.
CPC ................ *C10G 67/02* (2013.01); *B01J 8/02* (2013.01); *B01J 8/1836* (2013.01); *B01J 8/22* (2013.01);
(Continued)

(58) Field of Classification Search
CPC ........ C10G 65/12; C10G 47/26; C10G 49/12; C10G 1/06; C10G 1/065; C10G 1/08; C10G 1/083; C10G 1/086
See application file for complete search history.

(56) References Cited

U.S. PATENT DOCUMENTS 3,530,066 A * 9/1970 Yutaka ..................... B01J 35/10
208/309
4,424,109 A * 1/1984 Huibers ................... B01J 23/85
208/409

(Continued)

FOREIGN PATENT DOCUMENTS

| CN | 1307926 A | 8/2001 |
| CN | 1459487   | 12/2003 |

(Continued)

OTHER PUBLICATIONS

First Office Action of Chinese Patent Application No. 2016112552187 dated Apr. 11, 2019.

(Continued)

*Primary Examiner* — Michelle Stein
(74) *Attorney, Agent, or Firm* — McCarter & English, LLP

(57) ABSTRACT

A method and device for lightening heavy oil by utilizing a suspension-bed hydrogenation process are provided. In the process, a part of a raw oil is mixed with a suspension-bed hydrocracking catalyst to form a first mixture, then the first mixture is subjected to first shear and second shear in sequence so as to realize high dispersion and mixing of the catalyst and the raw oil; through pretreatment of the raw oil, the device can prevent the raw oil from coking in the hydrogenation process; through the adoption of a suspension-bed reactor with a liquid phase self-circulation function or a cold-wall function; and light and heavy components are separated from the suspension-bed hydrogenated product in (Continued)

advance and only medium component is subjected to fixed-bed hydrogenation, thereby reducing the load of the fixed-bed hydrogenation, prolonging the service life of the fixed-bed catalyst, improving the yield and quality of gasoline and diesel, and being beneficial for energy conservation and emission reduction of the whole system.

14 Claims, 5 Drawing Sheets

(51) Int. Cl.

| | | |
|---|---|---|
| *B01J 8/02* | (2006.01) | |
| *B01J 8/18* | (2006.01) | |
| *B01J 8/22* | (2006.01) | |
| *B01J 19/24* | (2006.01) | |
| *B01J 19/00* | (2006.01) | |
| *B01J 8/34* | (2006.01) | |

(52) U.S. Cl.
CPC ............... *B01J 8/226* (2013.01); *B01J 8/228* (2013.01); *B01J 8/34* (2013.01); *B01J 19/006* (2013.01); *B01J 19/246* (2013.01); *B01J 2208/00017* (2013.01); *B01J 2208/00371* (2013.01); *B01J 2208/00902* (2013.01); *B01J 2219/00006* (2013.01); *B01J 2219/00768* (2013.01); *B01J 2219/00774* (2013.01)

(56) References Cited

U.S. PATENT DOCUMENTS

| | | | | |
|---|---|---|---|---|
| 4,818,373 | A * | 4/1989 | Bartholic | ................ B01J 20/16 208/127 |
| 5,389,238 | A | 2/1995 | Liu et al. | |
| 5,393,409 | A * | 2/1995 | Jan | ......................... C10G 47/16 208/108 |
| 2002/0051878 | A1* | 5/2002 | Lussier | .................... B01J 21/04 428/325 |
| 2005/0240058 | A1* | 10/2005 | Feng | ...................... B01D 1/065 564/416 |
| 2011/0167713 | A1 | 7/2011 | Quignard et al. | |
| 2013/0146508 | A1* | 6/2013 | Quignard | ............... C10G 1/006 208/413 |
| 2014/0209513 | A1* | 7/2014 | Hassan | ..................... F17D 1/00 208/419 |
| 2016/0340250 | A1* | 11/2016 | Chalifoux | ............... C04B 26/26 |
| 2018/0021761 | A1* | 1/2018 | Li | .......................... B01J 29/166 502/56 |

FOREIGN PATENT DOCUMENTS

| | | |
|---|---|---|
| CN | 1459487 A | 12/2003 |
| CN | 1459487 A | 12/2003 |
| CN | 201351763 Y | 11/2009 |
| CN | 101962571 | 2/2011 |
| CN | 102051207 | 5/2011 |
| CN | 102310005 A | 1/2012 |
| CN | 103242871 A | 8/2013 |
| CN | 204051658 U | 12/2014 |
| CN | 104388117 A | 3/2015 |
| CN | 104588079 A | 5/2015 |
| CN | 204752627 U | 11/2015 |
| CN | 105713662 A | 6/2016 |
| CN | 201611255218.7 | 12/2016 |
| CN | 201611255247.3 | 12/2016 |
| RU | 2504575 C2 | 1/2014 |
| RU | 2517186 C2 | 5/2014 |

OTHER PUBLICATIONS

Office action issued in corresponding Russian application No. 2017144591/04 dated Oct. 1, 2018. Translation provided.
Second Office Action from related Chinese patent application No. 2016112552187 dated Sep. 24, 2019.
Chinese Office Action dated Apr. 28, 2020 for Chinese Patent Application 201611255247.3.
Chinese Office Action dated Aug. 5, 2020 for Chinese Patent Application 201611255247.3 (with partial English translation).

\* cited by examiner

METHOD AND DEVICE FOR LIGHTENING HEAVY OIL BY UTILIZING A SUSPENSION-BED HYDROGENATION PROCESS

FIELD OF THE INVENTION

The present invention relates to the fields of coal and petrochemical technologies, in particular to a method and device for lightening heavy oil by utilizing a suspension-bed hydrogenation process.

BACKGROUND OF THE INVENTION

In recent years, as the oil resources worldwide have become increasingly scarce, and the crude oil has become seriously heavier and poorer in quality, the demand of the market on heavy fuel oil decreases rapidly while that on the light fuel oil increases continuously and rapidly, making deep processing technology of heavy and poor quality oil become a focal and difficult problem in the development of the petroleum refining industry. In addition to our country's fundamental reality featured by lean oil and abundant coal, while some petrochemical products can also be obtained from gasification and dry distillation products of coal, therefore, the production of light oil and chemical products by utilizing advanced coal conversion technology not only plays an active role in the industrial structure adjustment and the industrial level promotion of the chemical industry, but also is a strategic measure for our country to reduce the dependency on oil import, develop circular economy, reduce environmental pollution, and guarantee energy safety and sustainable economic development in the $21^{st}$ century.

The hydrogenation process using a suspension-bed is one of the ideal methods to lighten the heavy oil. The process is mainly as follows: a dispersed catalyst is mixed evenly with a raw oil to form a slurry, then the slurry enters a suspension-bed reactor together with high-pressure hydrogen for catalytic hydrogenation and cracking reaction in the presence of hydrogen, and such light oil products as naphtha and light oil are finally prepared. For example, Chinese patent document CN104388117A discloses a method for producing high-quality fuel oil by hydrocracking of the heavy oil, and the method comprises the following steps: (1) the heavy oil is mixed with the suspension-bed hydrocracking catalyst and hydrogen to form a first mixture and the first mixture enters a suspension-bed hydrocracking reactor, wherein the operating pressure in the suspension-bed hydrocracking reactor is 12-20 MPa, the temperature is 400° C. to 500° C., the volume ratio of hydrogen to oil is 500-1500, the added quantity of the catalyst accounts for 0-3.0% of the raw oil, and the space velocity is 0.3-1.0 $h^{-1}$; (2) the reactants in step (1) are separated in a hot high pressure separator, the gas phase products directly enter a fixed-bed reaction device for hydrogenation reaction and the liquid phase products enter a vacuum distillation tower; light-component products and heavy-component products are obtained from the vacuum distillation tower, the light-component products enter the fixed-bed reaction device and heavy-component products are discharged; and (3) after hydrogen and light hydrocarbon are separated, the products obtained from the fixed-bed reaction device enter a fractioning tower to obtain gasoline and diesel, and the heavy-component oil obtained from the bottom of the fractioning tower circularly enters the fixed-bed reaction device.

By adopting the above technology, the light component in the suspension-bed hydrogenation product is again subjected to fixed-bed hydrofining and upgrading, although high-quality light oil can be obtained, the above technology still has the following defects: 1) the heavy oil and suspension-bed hydrocracking catalyst are fed into the suspension-bed hydrocracking reactor only after simple mixing, the catalyst easily precipitates at the bottom of the reactor if its density is large, while the catalyst easily floats on the surface of the oil phase to form an encapsulated object if its density is small. The two cases will both influence the effect of solid liquid mixing, further influence the hydrogenation performance of the suspension-bed, and finally lead to a lower yield of light oil products; 2) as only one suspension-bed reactor is adopted, it cannot ensure that the three reactions including cracking, hydrogenation and coke adsorption are all performed in their suitable environmental conditions, which may lead to incomplete cracking, insufficient hydrogenation and incomplete coke adsorption, therefore, the liquid yield is low and the coke yield of the whole process is large, meanwhile, the oil products tend to condensation and coking more easily under a higher cracking reaction temperature, and coking may also lead to inactivation of the hydrogenation catalyst and incapability of the device for long-term and stable operation; and 3) the suspension-bed hydrogenated product enters a fixed-bed reactor too earlier without reasonable separation and increases the hydrogenation load of the fixed bed, thereby not only influencing liquid yield and oil quality, but also being not beneficial for energy conservation and emission reduction.

In view of this, the existing suspension-bed hydrogenation process and device need to be urgently improved in the art, as so to enhance the mixing effect of the catalyst and the raw oil, ensure smooth operation of each reaction, and optimize the separation method, thereby realizing energy conservation and emission reduction while improving liquid yield and quality of the light oil, and reducing the process cost to the greatest extent.

SUMMARY OF THE INVENTION

The technical problem to be solved by the present invention is to overcome the defects of uneven mixing of the catalyst and the raw oil, insufficient reaction and poor separation effect of the hydrogenated product in the existing suspension-bed hydrogenation process, and further provide a method and device for lightening heavy oil by utilizing a suspension-bed hydrogenation process which can ensure even mixing of the catalyst and the raw oil, sufficient reaction, good separation effect, high yield of light oil products with good quality, high yield of asphalt with good quality, and capability of energy conservation and emission reduction.

To this end, the technical solution adopted by the present invention to achieve the above objective is as follows:

A method for lightening heavy oil by utilizing a suspension-bed hydrogenation process, comprising the following steps:

(1) mixing a part of a raw oil with a suspension-bed hydrocracking catalyst to form a first mixture, carrying out first shear and second shear in sequence on the first mixture to obtain a catalyst slurry;

(2) mixing the catalyst slurry with the remaining raw oil and hydrogen to form a second mixture and then feeding the second mixture into a suspension-bed hydrogenation reactor for undergoing hydrocracking reaction at a pressure of 18-22.5 MPa, a temperature of 390° C. to 460° C. and a volume ratio of hydrogen to oil being 800-1500 to obtain a hydrocracked product;

(3) subjecting the hydrocracked product obtained in step (2) to a hot high pressure separation to obtain a gas stream and an oil stream; subjecting the gas stream obtained from the hot high pressure separation to a cold high pressure separation and a cold low pressure separation in sequence to obtain an oil stream, subjecting the oil stream obtained from the hot high pressure separation to a hot low pressure separation to obtain a gas stream and an oil stream, subjecting the gas stream obtained from the hot low pressure separation and the oil stream obtained from the cold low pressure separation to stripping separation to obtain dry gas, naphtha and bottom oil; and (4) subjecting the oil stream obtained from the hot low pressure separation to vacuum distillation to obtain a first sidestream oil at a first sidestream line and a second sidestream oil at a second sidestream line, and feeding the first sidestream oil, the second sidestream oil and the bottom oil into a fixed-bed hydrogenation reactor for undergoing hydrotreatment again to obtain a hydrogenated product which is then subjected to separation to obtain a light oil of less than 350° C.

Preferably, the suspension-bed hydrocracking catalyst accounts for 0.1-10 wt. % of the catalyst slurry and has a particle size of 5 μm to 500 μm.

Preferably, the suspension-bed hydrocracking catalyst comprises a composite support and an active metal oxide loaded on the composite support, and wherein a mass ratio of the composite support to the active metal contained in the active metal oxide is 100:(0.5-10), wherein the active metal is selected from Group VIII metal and/or Group VIB metal;

the composite support comprises a semi-coke pore-enlarging material, a molecular sieve and a spent catalytic cracking catalyst, wherein a mass ratio of the semi-coke pore-enlarging material to the molecular sieves to the spent catalytic cracking catalyst is (1-5):(2-4):(0.5-5);

the semi-coke pore-enlarging material has a specific surface area of 150-300 m$^2$/g and an average pore size of 70-80 nm;

the molecular sieve has a specific surface area of 200-300 m$^2$/g and an average pore size of 5-10 nm; and the spent catalytic cracking catalyst has a specific surface area of 50-300 m$^2$/g and an average pore size of 3-7 nm.

Preferably, the spent catalytic cracking catalyst comprises the following components in parts by weight:

| | |
|---|---|
| Y-type molecular sieve | 15-55 parts |
| aluminum oxide | 15-55 parts |
| at least one of nickel, vanadium or iron | 0.5-1 part |

Preferably, the raw oil is the oil which is subjected to purification treatment, and the purification treatment comprises the following steps:

contacting the raw oil with the adsorbent which is in a fluidized state to produce an adsorption effect, and collecting liquid phase after the adsorption, wherein the adsorbent is semi-coke and/or kaolin.

Preferably, the adsorption is performed at a temperature of 50° C. to 100° C. and a pressure of 0-1.0 MPa, a mass ratio of the raw oil to the adsorbent is 1:(0.05-0.2), the specific surface area of the semi-coke is 100-500 m$^2$/g, and the specific surface area of kaolin is 50-200 m$^2$/g.

Preferably, the suspension-bed hydrogenation reactor comprises a first reactor and a second reactor connected in series, wherein the first reactor is a suspension-bed hydrocracking reactor and the second reactor is a suspension-bed hydrogenation stabilizing reactor, and an operating temperature in the suspension-bed hydrogenation stabilizing reactor is lower than that in the suspension-bed hydrocracking reactor by 20° C. to 50° C.

Preferably, the catalyst slurry is mixed with the remaining raw oil and hydrogen to form a second mixture and then feeding the second mixture into the suspension-bed hydrocracking reactor for undergoing hydrocracking reaction to obtain a hydrocracked product; then the hydrocracked product is fed into the suspension-bed hydrogenation stabilizing reactor for hydrofining in the presence of a suspension-bed hydrogenation stabilizing catalyst to form a hydrofined product; the suspension-bed hydrogenation stabilizing catalyst is a supported catalyst which comprises aluminum oxide as the supporter and which is loaded with hydrogenation active metal, selected from Group VIII metal and/or Group VIB metal.

Preferably, in step (4), the oil stream obtained from the hot low pressure separation is firstly subjected to distillation under normal pressure to obtain a first fraction collected at a temperature of 150° C. to 250° C. and a second fraction collected at a temperature of greater than 250° C.; the second fraction is heated and is subjected to the vacuum distillation; and the first fraction is combined with the naphtha.

Preferably, a third sidestream oil is obtained at a third sidestream line of the vacuum distillation, 80-90 wt % of the third sidestream oil is combined with 5-20 wt % of the second sidestream oil to serve as a washing liquid for the third sidestream line, the remaining 10-20 wt % of the third sidestream oil serves as a washing liquid for washing the oil stream and gas stream generated from the hot low pressure separation to obtain a washed gas stream and a washing recovery solution, and 30-90 wt % of the washing recovery solution is recycled for serving as a washing liquid for the hot low pressure separation; the third sidestream oil has a distillation range consistent with the operating temperature of the hot low pressure separation.

Preferably, the technical parameters of hot high-pressure separation are as follows:

the hot high pressure separation is carried out at a pressure of 18-22.5 MPa and a temperature of 350° C. to 460° C.;

the cold high pressure separation is carried out at a pressure of 18-22.5 MPa and a temperature of 30° C. to 60° C.;

the cold low pressure separation is carried out at a pressure of 0.5-1.5 MPa and a temperature of 30° C. to 60° C.;

the hot low pressure separation is carried out at a pressure of 0.5-1.5 MPa and a temperature of 350° C. to 430° C.;

the stripping separation is carried out at a temperature of 80° C. to 90° C.;

the first sidestream line of the vacuum distillation is operated at a temperature of 110° C. to 210° C., and the second sidestream line is operated at a temperature of 200° C. to 300° C.;

the fixed-bed hydrogenation reactor has an operating pressure of 18-22.5 MPa, a temperature of 360° C. to 420° C., a volume ratio of hydrogen to oil being 500-1500 and a volume space velocity of 0.5-1.5 h$^{-1}$.

Preferably, the gas stream obtained from the cold high pressure separation is used as recycle hydrogen, and the oil stream obtained from the cold high pressure separation is subjected to the cold low pressure separation to obtain a gas stream which is then mixed with the dry gas to serve as fuel gas.

Preferably, the suspension-bed hydrogenation reactor is connected with a drainage system which comprises a drain pipeline, a cooling and separating system, a flare system and a raw oil recycling system, wherein one end of the drain pipeline is connected with the bottom of the suspension-bed hydrogenation reactor, and the other end of the drain pipeline is connected with the cooling and separating system; when the temperature of the suspension-bed hydrogenation reactor instantly rises and exceeds a normal reaction temperature, a feed valve of the suspension-bed hydrogenation reactor is closed and drain valve bank in the cooling and separating system is opened, such that materials in the suspension-bed hydrogenation reactor are depressurized to 0.6-1.0 MPa via a decompression orifice plate arranged on the drain pipeline, and then discharged into the cooling and separating system for cooling and separating to obtain a gas-phase material and a liquid-solid two-phase material, and then the gas-phase material is discharged into the flare system, and the liquid-solid two-phase material is conveyed to the raw oil recycling system, thereby realizing emergency drainage of the suspension-bed hydrogenation reactor; preferably, the materials in the suspension-bed hydrogenation reactor firstly enter a drainage tank of the cooling and separating system to be mixed with the flushing oil in the drainage tank for cooling to obtain a cooled liquid-solid two-phase material and a cooled gas material, wherein the cooled liquid-solid two-phase material is discharged into the raw oil recycling system via a blow-down pipeline which is connected to the bottom of the drainage tank; and the cooled gas material enters an emergency drainage gas air cooler via a gas discharge pipeline connected to the top of the drainage tank for undergoing cooling and liquid separation to obtain a gas-phase material and a liquid-phase material, wherein the gas-phase material is fed into the flare system, and the liquid-phase material is sent back to the drainage tank and finally discharged to the raw oil recycling system.

A device for lightening heavy oil by utilizing a suspension-bed hydrogenation process, comprising:

a catalyst slurry preparation unit, comprising a first shear agitation unit and a second shear agitation unit which are connected in sequence, wherein the first shear agitation unit comprises a catalyst preparation tank, a catalyst circulating pump, a first powder-liquid shear mixer and a first catalyst feeding system, wherein the catalyst preparation tank is provided with a first solvent inlet and a first slurry inlet on the side wall thereof, and a first slurry outlet at the bottom thereof, wherein the first slurry outlet is connected with a liquid inlet of the first powder-liquid shear mixer via the catalyst circulating pump, a solid material inlet of the first powder-liquid shear mixer is communicated with the first catalyst feeding system, and a slurry outlet of the first powder-liquid shear mixer is connected with the first slurry inlet of the catalyst preparation tank; and the second shear agitation unit comprises a second powder-liquid shear mixer and a catalyst mixing tank, wherein the first slurry outlet of the catalyst preparation tank is connected with the catalyst mixing tank via the second powder-liquid shear mixer;

a suspension-bed hydrogenation unit, provided with a slurry inlet which is connected with a discharge hole of the catalyst mixing tank;

a separation unit, comprising a hot high pressure separator, a hot low pressure separator, a cold high pressure separator, a cold low pressure separator, a stripping tower and a vacuum tower, wherein the hot high pressure separator has a feed inlet which is connected with a slurry outlet of the suspension-bed hydrogenation unit; and a fixed-bed hydrogenation unit, comprising a fixed-bed hydrogenation reactor and a separation tower, wherein the fixed-bed hydrogenation reactor has a feed inlet which is respectively connected with a bottom oil outlet of the stripping tower as well as a first sidestream line outlet and a second sidestream line outlet of the vacuum tower, and the fixed-bed hydrogenation reactor has a discharge hole which is communicated with the separation tower.

Preferably, the catalyst slurry preparation unit further comprises a third shear agitation unit which comprises a catalyst conveying tank, a third powder-fluid shear mixer, a second catalyst feeding system and a catalyst circulating pump, wherein the catalyst conveying tank is provided with a second solvent inlet and a second slurry inlet respectively arranged on the side wall thereof, and a second slurry outlet arranged at the bottom thereof, wherein the third powder-liquid shear mixer has a liquid inlet which is connected with the second slurry outlet or the first slurry outlet via the catalyst circulating pump, and has a solid material inlet which is communicated with the second catalyst feeding system, and has a slurry outlet which is connected with the second slurry inlet of the catalyst conveying tank; and wherein the second slurry outlet of the catalyst conveying tank is connected with the catalyst mixing tank via the second powder-liquid shear mixer.

Preferably, a stirrer is arranged in a lower part of the catalyst preparation tank, the catalyst conveying tank and/or the catalyst mixing tank, wherein the stirrer comprises a single layer or multiple layers of spiral impellers, and a rotational speed of a main shaft of the stirrer is 100-300 r/min.

Preferably, the suspension-bed hydrogenation unit comprises a suspension-bed hydrocracking reactor and a suspension-bed hydrogenation stabilizing reactor which are connected in series, and an operating temperature in the suspension-bed hydrogenation stabilizing reactor is lower than that in the suspension-bed hydrocracking reactor by 20° C. to 50° C.; and the suspension-bed hydrocracking reactor has a slurry inlet which is connected with the discharge hole of the catalyst mixing tank, and the suspension-bed hydrogenation stabilizing reactor has a slurry outlet which is communicated with the feed inlet of the hot high pressure separator.

Preferably, the suspension-bed hydrocracking reactor and/or the suspension-bed hydrogenation stabilizing reactor comprise(s):

a vertical reactor shell, provided with a liquid flow inlet at the bottom thereof and a liquid flow outlet on the top thereof;

a liquid phase circulating pipe, provided with two opening ends, and arranged inside the reactor shell, wherein an upper opening end of the liquid phase circulating pipe extends to the top of the reactor shell, and a lower opening end of the liquid phase circulating pipe is close to the liquid flow inlet of the reactor shell;

an inlet jet flow distributor, arranged inside the reactor shell, and comprising:

an annular boss, arranged on an inner side wall, close to the liquid flow inlet, of the reactor shell, and having an inner diameter which decreases and then increases along an axial direction of the reactor; and a flow deflector, arranged above the liquid flow inlet of the reactor shell, and having a revolved body which has an outer diameter being firstly increased and then decreased along its axial direction with its maximum outer diameter greater than a diameter of the liquid phase circulating pipe; a liquid inlet passage is formed between the flow deflector and the annular boss, and a portion of the flow deflector where the outer diameter of the flow deflector reaches a maximum is arranged opposite to a portion of the annular boss where the inner diameter of the annular boss reached a minimum such that the liquid inlet passage has a caliber of a minimum size; and more preferably, the annular boss has a trapezoid shaped longitudinal section along the axial direction of the reactor shell, wherein the trapezoid is laterally arranged, and a waistline of the trapezoid and the side wall of the reactor shell define an included angle of 15-75°; or the annular boss has an arch shaped longitudinal section along the axial direction of the reactor shell, and a tangent at an intersection point of the arch and the reactor shell and the side wall of the reactor shell define an included angle of 15-75°.

Preferably, the suspension-bed hydrocracking reactor and/or the suspension-bed hydrogenation stabilizing reactor comprise(s):

a vertical reactor barrel body, provided with an inlet arranged at the bottom thereof and an outlet arranged on the top thereof;

a jet device, arranged outside the reactor barrel body, and comprising a nozzle, a suction chamber and a diffuser, and the diffuser is connected with the inlet of the reactor barrel body;

a liquid receiver, adapted for collecting a liquid phase on the top of the reactor barrel body, and a liquid return pipe, with one end being communicated with a bottom of the liquid receiver and another end being communicated with the suction chamber;

more preferably, the liquid receiver is arranged inside the reactor barrel body and is close to the outlet of the reaction barrel body, and has an open top; or the liquid receiver is arranged outside the reactor barrel body, and is provided with a feed inlet which is communicated with the outlet of the reactor barrel body and is located higher than the outlet of the reactor barrel body in a vertical direction.

Preferably, the suspension-bed hydrocracking reactor and/or the suspension-bed hydrogenation stabilizing reactor comprise(s):

a reactor body, provided with a reaction product outlet on the top thereof, a cold hydrogen inlet arranged on a side wall thereof and a feed inlet arranged at the bottom thereof, and comprising a shell, a surfacing layer and an insulated lining in sequence from outside to inside; and a lining barrel, fixedly arranged inside the reactor body, and provided with an outlet arranged on the top thereof and an inlet arranged at the bottom thereof, wherein a side wall of the lining barrel and an inner side wall of the reactor body define a cavity serving as a first circulating passage, the side wall of the lining barrel is provided with a second circulating passage, and an interior of the lining barrel is communicated with the first circulating passage via the second circulating passage;

more preferably, the lining barrel comprises a conical barrel and an annular barrel, wherein a top end of the conical barrel is in sealing connection with the reaction product outlet of the reactor body, and a plurality of annular barrels are arranged below the conical barrel in sequence from top to bottom, and wherein a cavity between a side wall of the annular barrel and the inner side wall of the reactor body constitutes the first circulating passage, a gap between the conical barrel and the annular barrel adjacent thereto and a gap between two adjacent annular barrels constitute the second circulating passage.

Furthermore, the device for lightening heavy oil by utilizing a suspension-bed hydrogenation process further comprises a raw oil pretreatment unit which comprises:

at least one adsorption device, provided with an oil inlet and a gas inlet respectively at a lower part thereof, and provided with an oil outlet, a gas outlet and an adsorbent inlet respectively at an upper part thereof;

a draught fan, provided with an extraction opening and an exhaust port, wherein the extraction opening is communicated with the gas outlet of the adsorption device, and the exhaust port is connected with the gas inlet of the adsorption device;

a liquid solid separation device, provided with an inlet, a solid phase outlet and a liquid phase outlet, wherein the inlet is communicated with the oil outlet of the adsorption device, and the liquid phase outlet is connected with the first solvent inlet and/or the second solvent inlet;

more preferably, the raw oil pretreatment unit further comprises a kneading device and an adsorbent adding device, wherein the kneading device has a feed inlet which is respectively communicated with a slag discharge opening arranged at the bottom of the adsorption device and the solid phase outlet of the solid liquid separation device, and the adsorbent adding device is connected with the adsorbent inlet of the adsorption device.

Preferably, the hot high pressure separator has a gas stream outlet which is connected with a feed inlet of the cold high pressure separator, and has an oil stream outlet which is connected with a feed inlet of the hot low pressure separator; and the cold high pressure separator has an oil stream outlet which is connected with a feed inlet of the cold low pressure separator, and the cold low pressure separator has an oil stream outlet which is connected with a feed inlet of the stripping tower; the hot low pressure separator has a gas stream outlet which is communicated with the feed inlet of the stripping tower, and the hot low pressure separator has an oil stream outlet which is connected with a feed inlet of the vacuum tower.

Furthermore, the device for lightening heavy oil by utilizing a suspension-bed hydrogenation process further comprises an atmospheric tower which is arranged between the hot low pressure separator and the vacuum tower and is provided with an atmospheric residue outlet arranged at the bottom thereof, wherein the atmospheric residue outlet is connected with the vacuum tower; preferably, an adsorption tank is further arranged between the atmospheric residue outlet and the vacuum tower; an exhaust port is arranged on the top of the atmospheric tower, and the exhaust port is communicated with a heavy naphtha collecting tank.

Furthermore, the hot low pressure separator is provided with a washing section which is arranged therein and is located between the feed inlet and a gas stream outlet of the hot low pressure separator, and the washing section is provided with a washing liquid inlet;

the vacuum tower comprises a first washing section for the first sidestream line, a second washing section for the second sidestream line and a third washing section for the third sidestream line, all of which are arranged in sequence from top to bottom in the vacuum tower and located above a feed inlet of the vacuum tower, and the third washing section is provided with a third washing liquid inlet and a third sidestream oil outlet;

the second washing section for the second sidestream line has a second sidestream oil outlet which is connected with the third washing liquid inlet, and the third sidestream oil outlet is respectively communicated with the third washing liquid inlet and the washing liquid inlet of the washing section of the hot low pressure separator;

preferably, the washing section of the hot low pressure separator is further provided with a washed oil stream outlet which is respectively connected with the washing liquid inlet of the hot low pressure separator and an oil stream outlet of the hot low pressure separator;

preferably, the second washing section for the second sidestream line is further provided with a second washing liquid inlet, and the second sidestream oil outlet is respectively connected with the second washing liquid inlet and a second sidestream oil collecting device;

the first washing section for the first sidestream line is provided with a first sidestream oil outlet and a first washing liquid inlet, and the first sidestream oil outlet is respectively connected with the first washing liquid inlet and a first sidestream oil collecting device.

Furthermore, a heat exchange unit is further arranged between the hot high pressure separator and the cold high pressure separator, and the heat exchange unit comprises a first heat exchanger, a second heat exchanger, a third heat exchanger and an air cooler which are connected in series in sequence, wherein the gas stream from the hot high pressure separator exchanges heat with the raw oil in the first heat exchanger, exchanges heat with cold hydrogen in the second heat exchanger, and exchanges heat with the gas stream from the cold low pressure separator in the third heat exchanger; and wherein the vacuum tower is provided with a bottom stream outlet which is arranged at the bottom thereof and is connected with an asphalt forming plant.

Preferably, the technical parameters of hot high-pressure separation are as follows: the hot high pressure separator performs hot high pressure separation at a pressure of 18-22.5 MPa and a temperature of 350° C. to 460° C.;

the cold high pressure separator performs cold high pressure separation at a pressure of 18-22.5 MPa and a temperature of 30° C. to 60° C.;

the cold low pressure separator performs cold low pressure separation at a pressure of 0.5-1.5 MPa and a temperature of 30° C. to 60° C.;

the hot low pressure separator performs hot low pressure separation at a pressure of 0.5-1.5 MPa and a temperature of 350° C. to 430° C.;

the stripping tower performs stripping separation at a temperature of 80° C. to 90° C.;

the first sidestream line of the vacuum tower is operated at a temperature of 110° C. to 210° C., the second sidestream line is operated at a temperature of 200° C. to 300° C., and the third sidestream line is operated at a temperature of 300° C. to 390° C.;

the suspension-bed hydrogenation reactor is operated at an internal pressure of 18-22.5 MPa, an internal temperature of 390° C. to 460° C., and a volume ratio of hydrogen to oil being 800-1500;

the fixed-bed hydrogenation reactor is operated at an internal pressure of 18-22.5 MPa, an internal temperature of 360° C. to 420° C., a volume ratio of hydrogen to oil being 500-1500 and a volume space velocity of 0.5-1.5 h$^{-1}$.

Compared with the prior art, the above technical solution of the present invention possesses the following advantages:

1. In the method for lightening heavy oil by utilizing a suspension-bed hydrogenation process in the present invention, a part of a raw oil is mixed with a suspension-bed hydrocracking catalyst to form a first mixture, the first mixture is subjected to first shear and second shear in sequence so as to realize high dispersion and mixing of the catalyst and the raw oil to obtain the evenly mixed catalyst slurry and ensure that the catalyst can give full play to its hydrogenation catalytic activity, thereby being beneficial for improving conversion rate of the raw oil and yield of the light oil; and then the catalyst slurry is mixed with the remaining raw oil and hydrogen to form a second mixture, and the second mixture is fed into a suspension-bed hydrogenation reactor for hydrocracking reaction at a pressure of 18-22.5 MPa, a temperature of 390° C. to 460° C. and a volume ratio of hydrogen to oil being 800-1500; the obtained suspension-bed hydrogenated products are subjected to hot high-pressure separation to obtain a gas stream and an oil stream, wherein the gas stream is subjected to a cold low pressure separation and a cold low pressure separation in sequence to obtain an oil stream, the oil stream obtained from the hot high pressure separation is subjected to hot low pressure separation to obtain a gas stream and an oil stream, then the oil stream obtained from the hot high pressure separation is subjected to stripping operation to obtain dry gas, naphtha and bottom oil, the oil stream obtained from the hot low pressure separation is subjected to vacuum distillation to obtain a first sidestream oil at a first sidestream line and a second sidestream oil at a second sidestream line, and the first sidestream oil, the second sidestream oil and the bottom oil are fed into a fixed-bed hydrogenation reactor for undergoing hydrotreatment again to obtain a hydrogenated product which is then subjected to separation to obtain a light oil of less than 350° C. In the process of the invention, a reasonable separation process is adopted based on the components and property of the suspension-bed hydrogenated product, the components with low boiling points such as hydrogen, dry gas and naphtha are separated in advance from the suspension-bed hydrogenated product, and the heavy components such as third sidestream oil are also separated in advance from the suspension-bed hydrogenated product, and only the medium components such as bottom oil of the stripping tower, hot low pressure separation gas, first sidestream oil and second sidestream oil which can be converted into light oil are fed into the fixed-bed hydrogenation reactor for hydrocracking and hydrofining again, thereby not only greatly reducing hydrogenation load of the fixed bed, more importantly, improving yield and quality of the light oil to the greatest extent, but also effectively prolonging the service life of the fixed-bed catalyst, and being beneficial for energy conservation and emission reduction of the whole process.

2. In the method for lightening heavy oil by utilizing a suspension-bed hydrogenation process in the present invention, the composite support formed by a specific-structured semi-coke pore-enlarging material, a molecular sieve as well as a spent catalytic cracking catalyst and active metal oxide loaded on the composite support are adopted as the suspension-bed hydrocracking catalyst, and the feature of wide distribution of pore sizes (large pores account for 50-60%, the medium pores account for 20-30%, and the remaining ones are micro pores) is utilized, thereby being beneficial for the catalyst to give full play to its catalytic activity in the hydrogenation process, promoting cracking of the macromolecular compounds in the raw oil and adsorption of asphaltene and colloid, and further improving conversion rate of the raw oil and yield of the light oil.

3. In the method for lightening heavy oil by utilizing a suspension-bed hydrogenation process in the present invention, a raw oil is contacted with the adsorbent semi-coke and/or kaolin which are in a fluidized state, the adsorption effect of the above adsorbent is utilized to effectively remove the colloid, asphaltene and other solid impurities in the raw oil and prevent these substances from coking in the subsequent hydrogenation process, thereby being beneficial for improving the conversion rate of the raw oil and yield of the light oil.
4. In the method for lightening heavy oil by utilizing a suspension-bed hydrogenation process in the present invention, a first reactor and a second reactor connected in series are adopted, wherein the first reactor is a suspension-bed hydrocracking reactor and the second reactor is a suspension-bed hydrogenation stabilizing reactor, and an operating temperature in the suspension-bed hydrogenation stabilizing reactor is lower than that in the suspension-bed hydrocracking reactor by 20° C. to 50° C., which can ensure that the three reactions including cracking, hydrogenation and coke adsorption can all be performed in their suitable environmental conditions, thereby being beneficial for improving the conversion rate of the raw oil and yield of the light oil.
5. In the method for lightening heavy oil by utilizing a suspension-bed hydrogenation process in the present invention, an oil stream obtained from the hot low pressure separation is subjected to distillation under normal pressure to obtain a first fraction collected at a temperature of 150° C. to 250° C. and a second fraction collected at a temperature of greater than 250° C., then the first fraction (namely, heavy naphtha) is mixed with naphtha, while the second fraction is heated and is subjected to the vacuum distillation, therefore, on the one hand, the heavy naphtha can be prevented from vaporization in great quantities in a vacuum furnace, such that the outlet temperature of the vacuum furnace cannot reach the designed inlet temperature of the vacuum tower; on the other hand, the facts that the side stream oils of the vacuum tower are excessively light and the residue at the bottom of the tower cannot satisfy the requirement of asphalt moulding which are caused by the heavy naphtha entering the vacuum tower can be avoided, thereby reducing energy consumption of the down-stream fixed-bed reactor while obtaining high-quality light oil, wax oil and asphalt.
6. In the method for lightening heavy oil by utilizing a suspension-bed hydrogenation process in the present invention, 80-90 wt % of the third sidestream oil is combined with 5-20 wt % of the second sidestream oil to serve as a washing liquid for the third sidedstream line, the remaining 10-20 wt % of the third sidestream oil serves as a washing liquid for washing the oil stream and gas stream generated from the hot low pressure separation to obtain a washed gas stream and a washing recovery solution, and 30-90 wt % of the washing recovery solution is recycled for serving as a washing liquid for the hot low pressure separation, therefore, a closed-cycle washing circuit from the washing liquid for the third sidedstream line process to hot low pressure separation process and then returning to vacuum distillation process is formed, which can effectively separate and remove solid particles and other impurities in a gas stream obtained from the hot low pressure separation, second sidestream oil, first sidestream oil and vacuum cap gas, so as to reduce the content of solid in the light oil product prepared from the suspension-bed hydrogenation process. Meanwhile, in the above process, since the third sidestream oil is recycled and reused or used as the washing oil for the hot low pressure separation, it is prevented from being discharged to the bottom of the vacuum tower, thereby ensuring that the asphalt component at the bottom of the vacuum tower has a relatively high softening point, and improving the quality of the asphalt prepared by adopting the suspension-bed hydrogenation process.
7. In the method for lightening heavy oil by utilizing a suspension-bed hydrogenation process in the present invention, a gas stream obtained from the cold high pressure separation is used as recycle hydrogen, the oil stream obtained from the cold low pressure separation is then subjected to cold low pressure separation, and the gas stream obtained from cold low pressure separation is mixed with dry gas to serve as fuel gas, thereby further reducing energy consumption of the whole process.
8. In the method for lightening heavy oil by utilizing a suspension-bed hydrogenation process in the present invention, a drainage system is connected to the bottom of the suspension-bed hydrogenation reactor, such that when the temperature of the suspension-bed hydrogenation reactor instantly rises and exceeds the normal reaction temperature, a feed valve of the suspension-bed hydrogenation reactor is closed and the drain valve bank is opened, such that materials in the suspension-bed hydrogenation reactor are depressurized to 0.6-1.0 MPa via a decompression orifice plate arranged on the drain pipeline, and then discharged into the cooling and separating system for cooling and separating to obtain a gas-phase material and a liquid-solid two-phase material, and then the gas-phase material is discharged into the flare system, and the liquid-solid two-phase material is conveyed to the raw oil recycling system, thereby realizing emergency drainage of the suspension-bed hydrogenation reactor. During emergency drainage, the contact between hydrogen and liquid-solid phase can be avoided by rapidly draining the liquid-solid phase in the suspension-bed hydrogenation reactor in advance, such that the hydrogenation reaction no longer occurs, thereby effectively relieving and controlling the temperature run-away in the suspension-bed hydrogenation reactor. Since the liquid phase in the drained material evenly wraps the catalyst particles, the friction of the catalyst particles on the drain pipeline is reduced to a certain extent, thereby being beneficial for safe drainage, reducing energy consumption and cost and ensuring that the gas phase is remained in the suspension-bed hydrogenation reactor, meanwhile, a re-boosting process of the suspension-bed hydrogenation reactor is avoided when production is restored next time, and device fatigue caused by frequent boosting and depressurization of the device can be avoided.
9. The device for lightening heavy oil by utilizing a suspension-bed hydrogenation process in the present invention comprises a catalyst slurry preparation unit, a suspension-bed hydrogenation unit, a separation unit and a fixed-bed hydrogenation unit which are connected in sequence, wherein the catalyst slurry preparation unit further comprises a first shear agitation unit and second shear agitation unit, wherein the first shear agitation unit comprises a catalyst preparation tank, a catalyst circulating pump, a first powder-liquid shear mixer and a first catalyst feeding system, wherein the catalyst preparation tank is provided with a first solvent inlet and a first slurry inlet on the side wall thereof and a first slurry outlet at the bottom thereof, wherein the first slurry outlet is connected with a liquid inlet of the first powder-liquid shear mixer via the catalyst circulating pump, a solid material inlet of the first powder-liquid shear mixer is communicated with the first catalyst feeding system, and a slurry outlet of the first powder-liquid shear mixer is connected with the first slurry inlet of the catalyst preparation tank; the second shear agitation unit comprises a second powder-liquid shear mixer and a catalyst mixing tank, wherein the first slurry outlet is connected with the catalyst mixing tank via the second powder-liquid shear mixer. In the device of the present invention, the solid-liquid materials are conveyed to a catalyst preparation tank via the first shear agitation unit, playing a role of emulsification, mixing, homogeneity, grinding and shearing, so as to avoid agglomeration of the catalyst; the second shear agitation unit plays a role of conveying, grinding, dispensing and homogeneity, such that the solid catalyst is dispensed more evenly in the solvent after being grinded again. Therefore, the invention adopts two shear mixing units to realize high dispersion and mixing of the catalyst and the solvent, further enabling the catalyst to give full play to its function.

In the device of the present invention, a reasonable separation process is adopted based on the components and property of the suspension-bed hydrogenated product, the components with low boiling points such as hydrogen, dry gas and naphtha are separated in advance from the suspension-bed hydrogenated product, and the heavy components such as third sidestream oil are also separated in advance from the suspension-bed hydrogenated product, while through the connection of the feed inlet of the fixed-bed hydrogenation reactor with the bottom oil outlet of the stripping tower and the first sidestream oil outlet and the second sidestream oil outlet of the vacuum tower respectively, the medium components in the suspension-bed hydrogenated product such as bottom oil of the stripping tower, a gas stream obtained from the hot low pressure separation, first sidestream oil and second sidestream oil which can be converted into gasoline and diesel are fed into the fixed-bed hydrogenation reactor for hydrocracking and hydrofining again, thereby not only greatly reducing the hydrogenation load of the fixed bed, more importantly, improving yield and quality of gasoline and diesel to the greatest extent, but also effectively prolonging the service life of the fixed-bed catalyst, and being beneficial for energy conservation and emission reduction of the whole system.

10. In the device for lightening heavy oil by utilizing a suspension-bed hydrogenation process in the present invention, the catalyst slurry preparation unit further comprises a third shear agitation unit with the same components as the first shear agitation unit. The liquid inlet of the third powder-liquid shear mixer is connected with the second slurry outlet or the first slurry outlet, such that the third shear agitation unit or can be used as a strengthened mixing mechanism of the first shear agitation unit, and the solid-liquid material which is subjected to slurry preparation by the first shear agitation unit is further dispersed and mixed by the third shear agitation unit, or can be used as a standby mechanism of the first shear agitation unit during slurry discharge or in a failure, thereby ensuring uninterrupted preparation of the catalyst slurry to improve the system efficiency.

11. In the device for lightening heavy oil by utilizing a suspension-bed hydrogenation process in the present invention, a stirrer is arranged in a lower part of the catalyst preparation tank, the catalyst conveying tank and/or the catalyst mixing tank, wherein the stirrer comprises a single layer or multiple layers of spiral impellers, and a rotational speed of a main shaft of the stirrer is defined to be 100-300 r/min, so as to ensure even mixing of the solid catalyst and the solvent.

12. In the device for lightening heavy oil by utilizing a suspension-bed hydrogenation process in the present invention, the suspension-bed hydrogenation unit comprises a suspension-bed hydrocracking reactor and a suspension-bed hydrogenation stabilizing reactor which are connected in series, and an operating temperature in the suspension-bed hydrogenation stabilizing reactor is lower than that in the suspension-bed hydrocracking reactor by 20° C. to 50° C., which can ensure that the three reactions including cracking, hydrogenation and coke adsorption can all be performed in their suitable environmental conditions, thereby being beneficial for improving conversion rate of the raw oil and yield of the light oil.

13. In the device for lightening heavy oil by utilizing a suspension-bed hydrogenation process in the present invention, an annular boss is arranged on the inner side wall, close to the liquid flow inlet, of the reactor shell, and having an inner diameter which decreases and then increases along an axial direction of the reactor; meanwhile, a revolved body which serves as a flow deflector is arranged above the liquid flow inlet of the reactor shell, and has an outer diameter being firstly increased and then decreased along its axial direction, and a portion of the flow deflector where the outer diameter of the flow deflector reaches a maximum is arranged opposite to a portion of the annular boss where the inner diameter of the annular boss reached a minimum, such that the liquid inlet passage has a caliber of a minimum size, therefore, the flow deflector and the annular boss together form a structure which can make the feeding flow area of the reactor gradually decrease and then gradually increase from bottom to top, namely, the inlet jet flow distributor. The flow velocity of the liquid materials (such as heavy oil dispersed with catalyst) entering the catalyst is further increased when the liquid materials pass by the inlet jet flow distributor, such that the linear velocity of the flow in the suspension-bed reactor of the present invention is as large as possible; meanwhile, a liquid phase circulating pipe with its diameter being smaller than the maximum outer diameter of the flow deflector is arranged in the reactor shell, through the match between the liquid phase circulating pipe and the inlet jet flow distributor, the liquid materials can be evenly distributed into the space outside the liquid phase circulating pipe, such that liquid materials can sufficiently contact with hydrogen for reaction. As no flow dead zone exists in the suspension-bed reactor in the present invention, coking can be effectively reduced or even avoided.

14. In the device for lightening heavy oil by utilizing a suspension-bed hydrogenation process in the present invention, in the suspension-bed reactor, a jet device is arranged outside the barrel body, the diffuser of the jet device is connected with the inlet of the reactor barrel body, meanwhile, a liquid receiver for collecting a liquid phase on the top of the reactor barrel body is further arranged, a liquid return pipe is communicated at the bottom of the liquid receiver, and the other end of the liquid phase circulating pipe is communicated with the suction chamber of the jet device; then a liquid phase self-circulating circulating circuit can be formed by the suspension-bed reactor, the liquid receiver and the jet device. The working principle is as follows: the working fluid with a certain pressure (such as heavy oil dispersed with catalyst) is ejected out at a high speed via the nozzle of the jet device, then the pressure energy is converted into kinetic energy; a low pressure area is formed at the outlet area of the nozzle, the liquid phase in the liquid return pipe is attracted into the suction chamber of the jet device, and then the two liquid materials are subjected to mixing and energy exchange in the diffuser of the jet device to convert kinetic energy into pressure energy, and finally the two liquid materials enter the reactor barrel body; in the suspension-bed reactor, liquid materials contact sufficiently with the hydrogen and react, and as the suspension-bed reactor in the present invention is an empty-barrel reactor, and no flow dead zone exists therein, therefore, coking can be effectively reduced or even avoided.

15. In the device for lightening heavy oil by utilizing a suspension-bed hydrogenation process in the present invention, through the suspension-bed reactor, a side wall of the lining barrel and an inner side wall of the reactor body define a cavity serving as a first circulating passage, and the side wall of the lining barrel is provided with a second circulating passage, and an interior of the lining barrel is communicated with the first circulating passage via the second circulating passage, such that when cold hydrogen enters the suspension-bed reactor, it can enter the lining barrel from different parts of the lining barrel, so as to ensure that materials at different positions of the lining barrel can all contact with cold hydrogen, thereby ensuring even mixing of the materials and cold hydrogen, enabling the temperature of the materials in the suspension-bed reactor to be more even, improving reaction efficiency of the materials, and reducing coking of materials due to partial hot points; in addition, a layer of thermal-insulated liquid can be formed between the lining barrel and the inner side wall of the reactor body by the cold hydrogen entering the reactor body, therefore, the materials between the lining barrel and the inner side wall of the reactor body can be prevented from aggregation and coking, the thermal-insulated lining can be prevented from being damaged and falling off, and the wall temperature of the outer wall of the reactor body can be lower than the medium temperature.

16. In the device for lightening heavy oil by utilizing a suspension-bed hydrogenation process in the present invention, through the raw oil pretreatment unit, the extraction opening of the draught fan is communicated with the gas outlet of the adsorption device, and the exhaust port of the draught fan is connected with the gas inlet of the adsorption device, such that the adsorbent in the adsorption device is in a fluidized state, then the colloid, asphaltene and other solid impurities in the raw oil can be effectively removed at one time with only a few amount of adsorbent, thereby preventing these substances from coking in subsequent processing, and being beneficial for improving the conversion rate of the raw oil and yield of the light oil.

A kneading device is further arranged in the raw oil pretreatment unit in the present invention, and the feed inlet of the kneading device is respectively communicated with the slag discharge opening arranged at the bottom of the adsorption device and a solid-phase outlet of the solid-liquid separation device, then the used adsorbent can be utilized to prepare a binder asphalt, and the added value of the whole system is improved.

17. In the device for lightening heavy oil by utilizing a suspension-bed hydrogenation process in the present invention, an atmospheric tower is arranged between the hot low pressure separator and the vacuum tower, and the atmospheric residue outlet at the bottom of the atmospheric tower is connected with the vacuum tower, so as to conduct atmospheric distillation on the oil stream obtained from a hot low pressure separation by utilizing the atmospheric tower to remove the first fraction collected at a temperature of 150° C. to 250° C., namely, heavy naphtha, then vacuum distillation is conducted on the second fraction collected at a temperature of greater than 250° C., therefore, on the one hand, the heavy naphtha can be prevented from vaporization in great quantities in a vacuum furnace, such that the outlet temperature of the vacuum furnace cannot reach the designed inlet temperature of the vacuum tower; on the other hand, the facts that the side stream oils of the vacuum tower are excessively light and the residue at the bottom of the tower cannot satisfy the requirement of asphalt moulding which are caused by the heavy naphtha entering the vacuum tower can be avoided, therefore, after the suspension-bed hydrogenated product are subjected to atmospheric distillation and vacuum distillation, high-quality diesel, wax oil and asphalt can be obtained, while the above diesel and wax oil enter the down-stream fixed-bed reactor for hydrofining, thereby reducing unnecessary energy consumption and costs.

18. In the device for lightening heavy oil by utilizing a suspension-bed hydrogenation process in the present invention, a washing section for the hot low pressure separation is arranged in the hot low pressure separator, a first washing section for the first sidestream line, a second washing section for the second sidestream line and a washing section for the third sidestream line are arranged in the vacuum tower in sequence, the second sidestream oil outlet of the second washing section for the second sidestream line is connected with the washing liquid inlet for the third sidedstream line, and the third sidestream oil outlet is respectively communicated with the washing liquid inlet for the third sidedstream line and the washing liquid inlet for the hot low pressure separation, therefore, a closed-cycle washing circuit is formed from the washing section for the third sidedstream line to the washing section for the hot low pressure separation and then returning to the vacuum tower, which can effectively separate and remove solid particles and other impurities in a gas stream obtained from the hot low pressure separation, second sidestream oil, first sidestream oil and vacuum cap gas, so as to reduce the content of solid in the light oil product prepared from the suspension-bed hydrogenation process. In addition, since the third sidestream oil is recycled and reused or used as the flushing oil for the hot low pressure separation, it is prevented from being discharged to the bottom of the vacuum tower, thereby ensuring that the asphalt component at the bottom of the vacuum tower have a relatively high softening point, and improving the quality of the asphalt prepared by adopting the suspension-bed hydrogenation process. Meanwhile, a heat exchanger does not need to be arranged on the washing section for the third sidestream line, which is beneficial for reducing energy consumption of the whole system.

BRIEF DESCRIPTION OF THE DRAWINGS

To describe the technical solution in the specific embodiments of the present invention more clearly, a brief introduction will be made below on the accompanying drawings required to be used in the specific embodiments. Apparently, the accompanying drawings described below are some embodiments of the present invention. For those skilled in the art, other accompanying drawings can be obtained based on these accompanying drawings without any creative effort.

Figure 1:
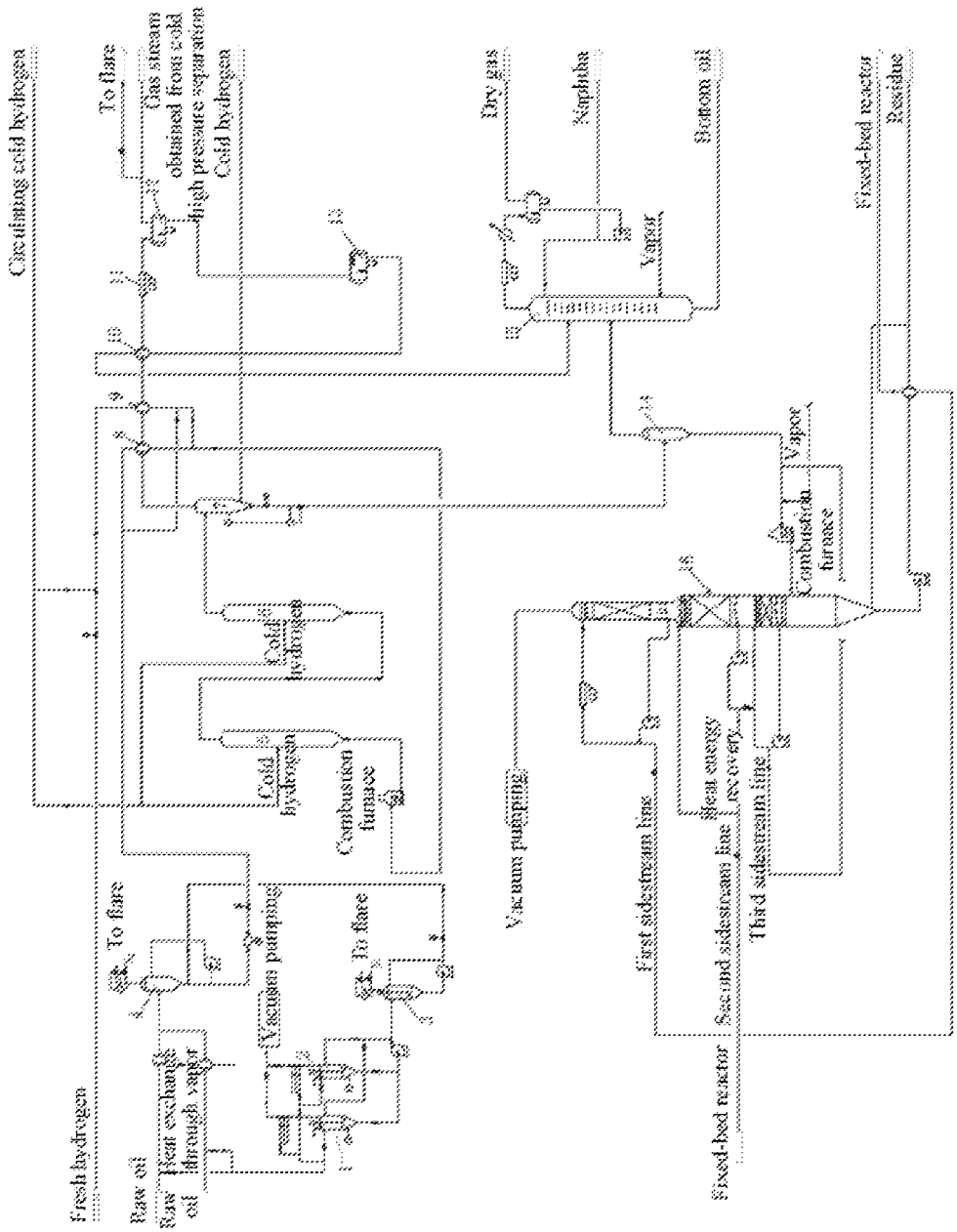
FIG. 1 is a flow chart of a method for lightening heavy oil by utilizing a suspension-bed hydrogenation process provided in the present invention, namely, a device structure diagram.

1—first shear agitation unit, 2—third shear agitation unit, 3—second shear agitation unit, 4—combustion furnace, 5—suspension-bed hydrocracking reactor, 6—suspension-bed hydrogenation stabilizing reactor, 7—hot high pressure separator, 8—first heat exchanger; 9—second heat exchanger; 10—third heat exchanger; 11—air condenser, 12—cold high pressure separator, 13—cold low pressure separator, 14—hot low pressure separator, 15—stripping tower; 16—vacuum tower; 20—second catalyst feeding system; 21—catalyst preparation tank; 22—catalyst conveying tank; 23—stirrer; 24—first powder-liquid shear mixer; 25—second powder-liquid shear mixer; 26—catalyst circulating pump; 27—third powder-liquid shear mixer; 28—first catalyst feeding system; 29—catalyst mixing tank; 31—oil pump; 32—adsorption device; 33—adsorbent adding device; 34—liquid solid separation device; 35—draught fan; 36—kneading device; 41—reactor shell; 42—liquid flow inlet; 43—liquid phase circulating pipe; 44—annular boss; 45—flow deflector; 46—liquid inlet passage; 47—diffuser; 48—liquid return passage; 51—solvent buffer tank; 52—slurry preparation tank; 53—slurry mixing tank; 54—stirrer; 55—solid catalyst feeding system; 56—Venturi tube; 57—shear mixer; 58—solvent booster pump; 60—reactor barrel body; 61—nozzle; 62—suction chamber; 63—diffuser; 64—liquid receiver; 65—liquid return pipe; 71—reactor body; 72—reaction product outlet; 73—cold hydrogen inlet; 74—feed inlet; 75—shell; 76—lining barrel; 77—outlet; 78—inlet; 79—cavity; 80—first annular passage; 81—second circulating passage; 83—first gas hole; 84—second gas hole; 85—conical barrel; 86—annular barrel; 87—thermal-insulated lining; 88—surfacing layer; 90—bracket.

DETAILED DESCRIPTION OF THE EMBODIMENTS

A clear and complete description of the technical solution of the present invention will be given below in combination with the accompanying drawings. Obviously, the described embodiments are only a part, but not all, of the embodiments of the present invention. Based on the embodiments of the present invention, all the other embodiments obtained by those of ordinary skill in the art without any creative effort shall all fall into the protection scope of the present invention.

In the description of the present invention, it should be noted that, the orientation or positional relationship indicated by such terms as "center", "up", "down", "left", "right", "vertical", "horizontal", "inner" and "outer" is the orientation or positional relationship based on the accompanying drawings. Such terms are merely for the convenience of description of the present invention and simplified description, rather than indicating or implying that the device or element referred to must be located in a certain orientation or must be constructed or operated in a certain orientation, thereby the terms cannot be understood as a limitation to the present invention. In addition, terms including "first", "second" and "third" are only for the purpose of description, rather than indicating or implying relative importance. Unless otherwise stipulated and defined definitely, such terms as "communicated", "connected" and "in connection" should be understood in their broad sense, e.g., the connection can be a fixed connection, a detachable connection or an integral connection; can be mechanical connection or electrical connection; can be direct connection or can be indirect connection through an intermediate, and can also be the communication between two elements. For those skilled in the art, the specific meanings of the above terms in the present invention can be understood according to specific conditions.

In addition, the technical features involved in different embodiments of the present invention described below can be combined with each other as long as they are not conflicted with one another.

The property of the coal tar used in the embodiments below is as shown in Table 1:

TABLE 1

| Property of Coal Tar | |
|---|---|
| Analysis Items | Values |
| Fraction | |
| Density (20° C.), kg/m$^3$ | 0.9822 |
| Distillation range, ° C. (D2287) | |
| IBP/10% | 165/222 |
| 30%/50% | 289/332 |
| 70%/90% | 366/407 |
| 95%/EBP | 430/524 |
| Sulphur, % | 0.13 |
| Nitrogen, % | 0.7659 |
| C/H | 83.37/9.16 |
| Condensation point, ° C. | 10 |
| Viscosity (100° C.), mm/s$^2$ | 3.467 |
| Carbon residue, wt % | 0.47 |
| Acid value, mgKOH/g | 0 |
| Heavy metal/ppm | |
| Fe | 40.47 |
| Na | 0.37 |
| Ni | 0.0143 |
| V | 0.0252 |
| Mass spectrum components, m % | |
| Asphaltene | 20.2 |
| Colloid | 17.2 |
| Alkane | 10.1 |
| Cyclanes in total | 8.2 |
| Among which: single-loop/double-loop | 3.2/1.0 |
| Trio-loop/tetra-loop | 2.0/1.4 |
| Penta-loop/hex-loop | 0.5/0.1 |
| Arene in total | 44.3 |

TABLE 1-continued

| Property of Coal Tar | |
|---|---|
| Analysis Items | Values |
| Among which: single-loop/double-loop | 10.4/17.3 |
| Trio-loop/tetra-loop | 9.6/4.4 |
| Penta-loop/thiophene | 0.0/2.2 |
| Unidentified | 0.4 |

The property of the residue oil used in the embodiments below is as shown in Table 2:

TABLE 2

| Property of Residue Oil | |
|---|---|
| Density (20° C.), kg/m$^3$ | 0.9423 |
| Carbon residue, wt % | 14.52 |
| Sulphur, wt % | 4.51 |
| Colloid, wt % | 18.4 |
| Asphaltene, wt % | 13.2 |
| Fe, μg/g | 14 |
| Ni, μg/g | 35 |
| V, μg/g | 56 |

The property of the semi-coke powder used in the embodiments below is as shown in Table 3:

TABLE 3

| Property of Semi-coke | | |
|---|---|---|
| Test items | Unit | Values |
| Water $M_t$ | % | <10 |
| Ash content $A_d$ | % | <6 |
| Volatile components $V_{daf}$ | % | 5-7 |
| Heating quantity of bomb cylinder (Qb, ad) | MJ/kg | 29-31 |
| Sulphur $S_{t,d}$ | % | ≤0.5 |
| Fixed carbon $FC_{ad}$ | % | 80-85 |
| Particle size range | mm | 0.2-1 |

Embodiment 1

As shown in FIG. 1, the method for lightening heavy oil by utilizing a suspension-bed hydrogenation process provided by the present embodiment comprises the following steps:

(1) taking residue oil as a raw oil of the present process, taking half of the residue oil to mix with the suspension-bed hydrocracking catalyst to form a first mixture, and subjecting the first mixture to first shear and second shear in sequence to obtain a catalyst slurry;

(2) mixing the catalyst slurry with the remaining residue oil and hydrogen to form a second mixture and feeding the second mixture into a suspension-bed hydrogenation reactor for undergoing hydrocracking reaction at a pressure of 18 MPa, a temperature of 425° C., and a volume ratio of hydrogen to oil controlled at 1000 to obtain a hydrocracked product;

(3) after 1.5 h, subjecting the hydrogenated product obtained in step (2) to a hot high pressure separation at 18 MPa and 400° C. to obtain a gas stream and an oil stream respectively; after the gas stream obtained from the hot high pressure separation exchanges heat with the raw oil, cold hydrogen, the oil stream obtained from the cold low pressure separation and the air in sequence, subjecting the gas stream to cold high pressure separation at 18 MPa and 60° C. to obtain a gas stream and an oil stream, wherein the gas stream can be used as recycle hydrogen, and the oil stream is then subjected to cold low pressure separation at 1 MPa and 60° C. to obtain a gas stream and an oil stream, wherein gas stream can be used as fuel while the oil stream is fed into the stripping tower;

subjecting the oil stream obtained from the hot high pressure separation to a hot low pressure separation at 1 MPa and 390° C. to obtain a gas stream and an oil stream, and subjecting the gas stream obtained from the hot low pressure separation and the oil stream obtained from the cold low pressure separation to stripping separation at 90° C. to obtain dry gas, naphtha and bottom oil; and (4) subjecting the oil stream obtained from the hot low pressure separation to vacuum distillation, setting the operating temperatures of the first sidestream line, second sidestream line and third sidestream line to be 160° C., 230° C. and 300° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 20 MPa, the temperature to be 380° C., the volume ratio of hydrogen to oil to be 800, and the volume space velocity to be 1 h$^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 0.1% of the catalyst slurry and has a particle size of 100 μm-200 μm; the suspension-bed hydrocracking catalyst comprises a composite support and an active metal oxide loaded on the composite support, wherein a mass ratio of the composite support to the active metal contained in the active metal oxide is 100:1, and the active metal is molybdenum, nickel, cobalt and iron; the composite support comprises a semi-coke pore-enlarging material, a molecular sieve and a spent catalytic cracking catalyst in a mass ratio of 1:3:5, wherein the semi-coke pore-enlarging material is prepared in the following way: mixing semi-coke and sodium carbonate in a mass ratio of 1:2, activating for 0.5 h at 900° C. by water vapor, performing acid washing and water washing on the enlarged samples, centrifugally separating, and drying for 3 h at 100° C. to obtain the semi-coke pore-enlarging material, wherein the semi-coke pore-enlarging material has an average particle size of 60 μm, a specific surface area of 300 m$^2$/g, an average pore size of 70 nm, and an average pore volume of 3 cm$^3$/g; the molecular sieve is Y-type molecular sieve, with an average particle size of 1 mm, a specific surface area of 300 m$^2$/g, and an average pore size of 5 nm; and the spent catalytic cracking catalyst comprises Y-type molecular sieve, aluminum oxide and metal (nickel, vanadium and iron) in a mass ratio of 15:55:0.5, and has an average particle size of 150 μm, a specific surface area of 300 m$^2$/g, and an average pore size of 3 nm.

Embodiment 2

As shown in FIG. 1, the method for lightening heavy oil by utilizing a suspension-bed hydrogenation process provided by the present embodiment comprises the following steps:

(1) Purification treatment of coal tar

Introducing air into the coal tar, conducting backmixing contact between the kaolin powder with a particle size of 0.2 mm and a specific surface area of 50 m²/g and coal tar in a mass ratio of 0.1:1 and adsorbing at 50° C. and 0.5 MPa, wherein the flow of air required for each 1 kg of kaolin powder is 0.5 m³/s; performing layered settlement after the adsorption to obtain upper-layer material, then subjecting the upper-layer material to a solid liquid separation, wherein the obtained liquid phase is the purified coal tar;

compared with the coal tar before purification treatment, the carbon residue in the coal tar after purification in the present embodiment is reduced to 0.1%, reduced by 79%; the content of asphaltene is reduced by 76%; the content of colloid is reduced by 80%; and the content of the heavy metal impurity is reduced by 51%;

(2) mixing 30% purified coal tar with the suspension-bed hydrocracking catalyst to form a first mixture, and subjecting the first mixture to first shear and second shear in sequence to obtain a catalyst slurry;

(3) mixing the catalyst slurry with the remaining purified coal tar and hydrogen to form a second mixture and feeding the second mixture into a suspension-bed hydrogenation reactor for undergoing hydrocracking reaction at a pressure of 20 MPa, a temperature of 390° C., and a volume ratio of hydrogen to oil controlled at 1200 to obtain a hydrocracked product;

(4) after 0.5 h, subjecting the hydrogenated product obtained in step (3) to a hot high pressure separation at 19 MPa and 350° C. to obtain a gas stream and an oil stream; after the gas stream obtained from the hot high pressure separation exchanges heat with the raw oil, cold hydrogen, cold low pressure separation oil and the air in sequence, subjecting the gas stream obtained from the hot high pressure separation to a cold hot pressure separation at 18.5 MPa and 50° C. to obtain a gas stream and an oil stream, wherein the gas stream can be used as recycle hydrogen, and subjecting the oil stream obtained from the cold high pressure separation to cold low pressure separation at 1.2 MPa and 40° C. to obtain a gas stream and an oil stream, wherein the gas stream can be used as fuel while the oil stream is fed into the stripping tower;

subjecting the oil stream obtained from the hot high pressure separation to a hot low pressure separation at 1.1 MPa and 350° C. to obtain a gas stream and an oil stream, and separating the gas stream entering the stripping tower and the oil stream obtained from cold low pressure separation at 80° C. to obtain dry gas, naphtha and bottom oil;

(5) subjecting the oil stream obtained from the hot low pressure separation to vacuum distillation, setting the operating temperatures of the first sidestream line, second sidestream line and third sidestream line to be 110° C., 250° C. and 330° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and the bottom oil of the stripping tower for hydrocracking and hydrofining again, the operating pressure inside the fixed-bed hydrogenation reactor is controlled to be 18 MPa, the temperature to be 400° C., the volume ratio of hydrogen to oil to be 1000, and the volume space velocity to be 0.7 h$^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 5% of the catalyst slurry and has a particle size of 50 μm-300 μm; the suspension-bed hydrocracking catalyst comprises a composite support and an active metal oxide loaded on the composite support, wherein a mass ratio of the composite support to the active metal contained in the active metal oxide is 100:0.5, and the active metal is tungsten, molybdenum, cobalt and iron; the composite support comprises a semi-coke pore-enlarging material, a molecular sieve and a spent catalytic cracking catalyst in a mass ratio of 5:2:2.75, wherein the semi-coke pore-enlarging material is prepared in the following way: mixing semi-coke and sodium carbonate in a mass ratio of 1:6, activating for 0.5 h at 950° C. by water vapor, performing acid washing and water washing on the enlarged samples, centrifugally separating, and drying for 3 h at 150° C. to obtain the semi-coke pore-enlarging material, wherein the semi-coke pore-enlarging material has an average particle size of 100 μm, a specific surface area of 150 m²/g, an average pore size of 80 nm, and an average pore volume of 2 cm³/g; the molecular sieve is Y-type molecular sieve, with an average particle size of 2 mm, a specific surface area of 200 m²/g, and an average pore size of 6 nm; and the spent catalytic cracking catalyst comprises Y-type molecular sieve, aluminum oxide and metal (nickel, vanadium and iron) in a mass ratio of 55:15:1, and has an average particle size of 120 μm, a specific surface area of 200 m²/g, and an average pore size of 5 nm.

Embodiment 3

As shown in FIG. 1, the method for lightening heavy oil by utilizing a suspension-bed hydrogenation process provided by the present embodiment comprises the following steps:

(1) Preparation of catalyst slurry

Figure 5:
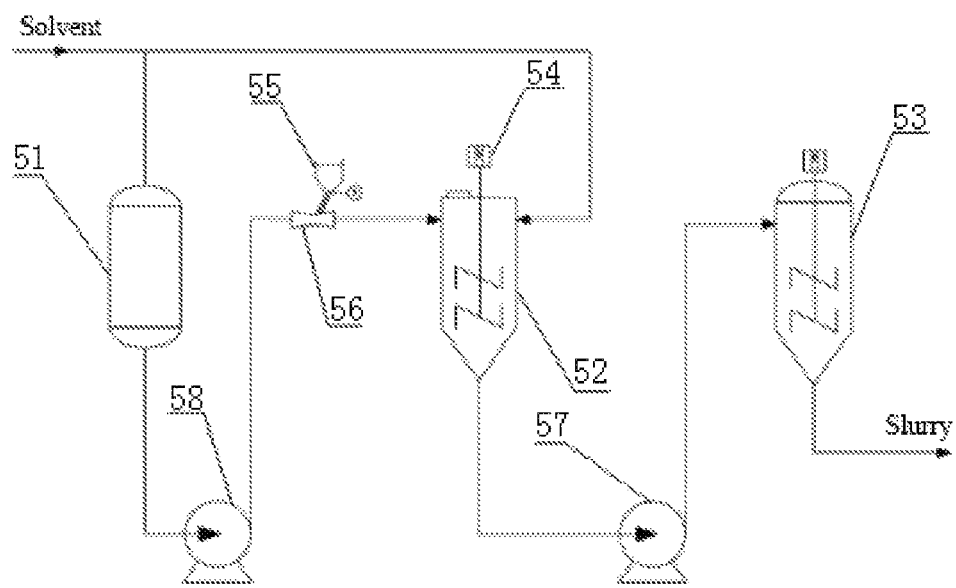
FIG. 5 is a structure diagram of the catalyst slurry preparation unit in Embodiment 13.

Selecting coal tar as the raw oil of the present process, please refer to FIG. 5, taking half of the coal tar and injecting into a solvent buffer tank 51, enabling the coal tar to enter a Venturi tube 56 after it is subjected to buffer by the solvent buffer tank 51 and pressurization by the solvent booster pump 58, meanwhile, feeding the suspension-bed hydrocracking catalyst into the Venturi tube 56 from the solid catalyst feeding system 55, subjecting the coal tar and the catalyst to preliminary mixing in the Venturi tube 56 and feeding the mixture into a slurry preparation tank 52, and forming first-level slurry under the stirring effect of the stirrer 54, wherein the temperature in the preparation tank is 90° C. and the pressure therein is normal pressure; and subjecting the first-level slurry to shearing, stirring and mixing via a shear mixer 57 and a slurry mixing tank 53 to finally obtain the catalyst slurry;

(2) mixing the catalyst slurry with the remaining coal tar and hydrogen to form a second mixture and feeding the second mixture into a suspension-bed hydrogenation reactor for undergoing hydrocracking reaction at a pressure of 21.5 MPa, a temperature of 440° C., and a volume ratio of hydrogen to oil controlled at 800 to obtain a hydrocracked product;

(3) after 0.8 h, subjecting the hydrogenated product obtained in step (2) to a hot high pressure separation at 20 MPa and 420° C. to obtain a gas stream and an oil stream; after the gas stream obtained from the hot high pressure separation exchanges heat with the raw oil, cold hydrogen, oil stream obtained from cold low pressure separation and the air in sequence, conducting cold high pressure separation at 20 MPa and 30° C. to obtain a gas stream and an oil stream, wherein the gas stream can be used as recycle hydrogen, and subjecting the oil stream obtained from the cold high pressure separation to cold low pressure separation at 0.8 MPa and 50° C. to obtain a gas stream and an oil stream, wherein the gas stream can be used as fuel while the oil stream is fed into the stripping tower;

subjecting the oil stream obtained from the hot high pressure separation to a hot low pressure separation at 0.8 MPa and 420° C. to obtain a gas stream and an oil stream, and separating the gas stream entering the stripping tower and the oil stream obtained from cold low pressure separation at 85° C. to obtain dry gas, naphtha and bottom oil;

(4) subjecting the oil stream obtained from the hot low pressure separation to vacuum distillation, setting the operating temperatures of the first sidestream line, second sidestream line and third sidestream line to be 140° C., 270° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 21 MPa, the temperature to be 350° C., the volume ratio of hydrogen to oil to be 900, and the volume space velocity to be 1.1 $h^{-1}$, then the fixed-bed hydrogenated product is separated to obtain a light oil product collected at a temperature of less than 350° C., and the tail oil is recycled.

In the present embodiment, the suspension-bed hydrocracking catalyst has a mass percent of accounts for 2% and has a particle size of 5 μm-100 μm; the suspension-bed hydrocracking catalyst comprises a composite support and an active metal oxide loaded on the composite support, wherein a mass ratio of the composite support to the active metal contained in the active metal oxide is 100:5, and the active metal is tungsten, nickel, cobalt and iron; the composite support comprises a semi-coke pore-enlarging material, a molecular sieve and a spent catalytic cracking catalyst in a mass ratio of 3:4:0.5, wherein the semi-coke pore-enlarging material is prepared in the following way: mixing semi-coke and sodium carbonate in a mass ratio of 1:4, activating for 0.5 h at 920° C. by water vapor, performing acid washing and water washing on the enlarged samples, centrifugally separating, and drying for 3 h at 120° C. to obtain the semi-coke pore-enlarging material, wherein the semi-coke pore-enlarging material has an average particle size of 80 μm, a specific surface area of 200 $m^2$/g, an average pore size of 75 nm, and an average pore volume of 2.5 $cm^3$/g; the molecular sieve is Y-type molecular sieve, with an average particle size of 3 mm, a specific surface area of 250 $m^2$/g, and an average pore size of 8 nm; and the spent catalytic cracking catalyst comprises Y-type molecular sieve, aluminum oxide and metal (nickel, vanadium and iron) in a mass ratio of 20:55:0.5, and has an average particle size of 100 μm, a specific surface area of 250 $m^2$/g, and an average pore size of 6 nm.

Embodiment 4

As shown in FIG. 1, the method for lightening heavy oil by utilizing a suspension-bed hydrogenation process provided by the embodiment comprises the following steps:

(1) Purification treatment of coal tar

Selecting coal tar as the raw oil of the present process, introducing air into the coal tar, conducting backmixing contact between the kaolin powder with a particle size of 0.3 mm and a specific surface area of 200 $m^2$/g and coal tar in a mass ratio of 0.05:1 and adsorbing at 75° C., wherein the flow of air required for each 1 kg of kaolin powder is 0.9 $m^3$/s; performing layered settlement after the adsorption to obtain upper-layer material and lower-layer sediment, then subjecting the upper-layer material to a solid liquid separation, wherein the obtained liquid phase is the purified coal tar, while the solid phase is combined with the lower-layer sediment, and the obtained mixture is kneaded with coke powder in a mass ratio of 0.8:1 to prepare a binder asphalt;

compared with the coal tar before purification treatment, the carbon residue in the coal tar after purification in the present embodiment is reduced by 80%; the content of asphaltene is reduced by 76.8%; the content of colloid is reduced by 80.7%; and the content of the heavy metal impurity is reduced by 52.1%;

(2) Preparation of catalyst slurry

Figure 2:
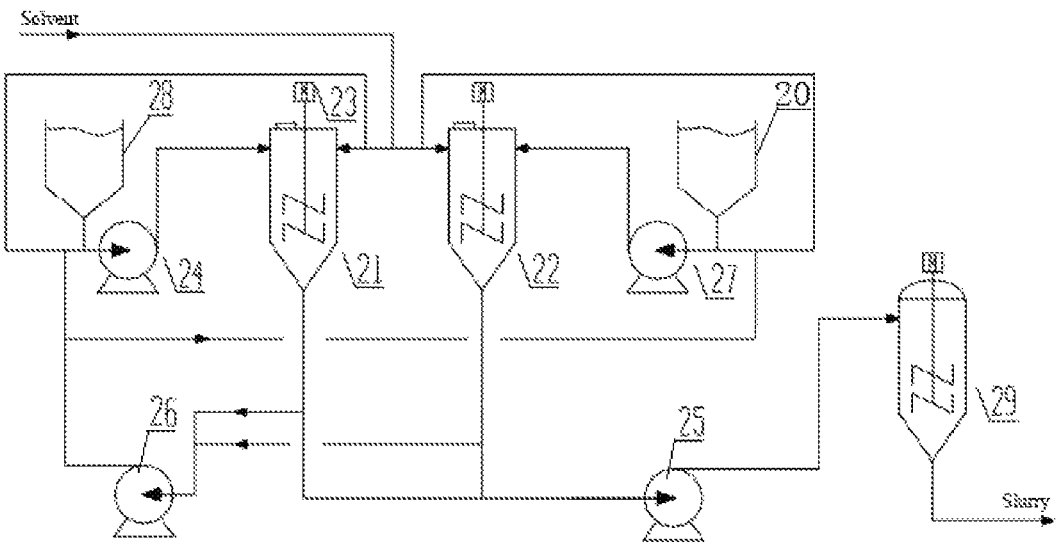
FIG. 2 is a structure diagram of the catalyst slurry preparation unit in Embodiments 4 and 12.

Please refer to FIG. 2. Taking half of the purified coal tar and injecting into the catalyst preparation tank, when the liquid level reaches the target level, automatically cutting off the liquid inlet valve, starting the stirrer of the catalyst preparation tank and simultaneously starting the catalyst circulating pump and the first powder-liquid shear mixer, such that the coal tar in the catalyst preparation tank is subjected to pressurization by the catalyst circulating pump and is mixed with the suspension-bed hydrocracking catalyst of the catalyst feeding system, and the first mixture is subjected to first shear mixing in the first powder-liquid shear mixer and then returns to the catalyst preparation tank; and introducing the first mixture output from the catalyst preparation tank again into the second powder-liquid shear mixer for second shear mixing; then conveying the first mixture into the catalyst mixing tank for mixing again to obtain a catalyst slurry;

(3) mixing the catalyst slurry with the remaining purified coal tar and hydrogen to form a second mixture and feeding the second mixture into a suspension-bed hydrogenation reactor for undergoing hydrocracking reaction at a pressure of 22.5 MPa, a temperature of 405° C., and a volume ratio of hydrogen to oil controlled at 1500 to obtain a hydrocracked product;

(4) after 1 h, subjecting the hydrogenated product obtained in step (3) to a hot high pressure separation at 22.5 MPa and 380° C. to obtain a gas stream and an oil stream; after the gas stream exchanges heat with the raw oil, cold hydrogen, oil stream obtained from cold low pressure separation and the air in sequence, conducting cold high pressure separation at 20 MPa and 40° C. to obtain a gas stream and an oil stream, wherein the gas stream can be used as recycle hydrogen, and subjecting the oil stream to cold low pressure separation at 0.5 MPa and 45° C. to obtain a gas stream and an oil stream, wherein the gas stream can be used as fuel while the oil stream is fed into the stripping tower;

subjecting the oil stream obtained from the hot high pressure separation to a hot low pressure separation at 0.5 MPa and 370° C. to obtain a gas stream and an oil stream, and separating the gas stream entering the stripping tower and the oil stream obtained from cold low pressure separation at 88° C. to obtain dry gas, naphtha and bottom oil;

(5) subjecting the oil stream obtained from the hot low pressure separation to vacuum distillation, setting the operating temperatures of the first sidestream line, second sidestream line and third sidestream line to be 130° C., 280° C.

and 390° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 19 MPa, the temperature to be 360° C., the volume ratio of hydrogen to oil to be 1200, and the volume space velocity to be 1.3 h$^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 7.5% of the catalyst slurry and has a particle size of 150 μm-500 μm; the suspension-bed hydrocracking catalyst comprises a composite support and an active metal oxide loaded on the composite support, wherein a mass ratio of the composite support to the active metal contained in the active metal oxide is 100:7, the active metal is tungsten, nickel, cobalt and iron; the composite support comprises a semi-coke pore-enlarging material, a molecular sieve and a spent catalytic cracking catalyst in a mass ratio of 2:2.5:1, wherein the semi-coke pore-enlarging material is prepared in the following way: mixing semi-coke and sodium carbonate in a mass ratio of 1:3, activating for 0.5 h at 910° C. by water vapor, performing acid washing and water washing on the enlarged samples, centrifugally separating, and drying for 3 h at 130° C. to obtain the semi-coke pore-enlarging material, wherein the semi-coke pore-enlarging material has an average particle size of 90 μm, a specific surface area of 250 m$^2$/g, an average pore size of 80 nm, and an average pore volume of 3 cm$^3$/g; the molecular sieve is ZSM-5-type molecular sieve, with an average particle size of 4 mm, a specific surface area of 300 m$^2$/g, an average pore size of 10 nm, and an average pore volume of 0.23%; and the spent catalytic cracking catalyst comprises Y-type molecular sieve, aluminum oxide and metal (nickel, vanadium and iron) in a mass ratio of 20:40:1, and has an average particle size of 150 μm, a specific surface area of 300 m$^2$/g, and an average pore size of 7 nm.

Embodiment 5

As shown in FIG. 1, the method for lightening heavy oil by utilizing a suspension-bed hydrogenation process provided by the present embodiment comprises the following steps:

(1) Taking coal tar as the raw oil of the present process, taking 60% of the coal tar to mix with the suspension-bed hydrocracking catalyst to form a first mixture, and subjecting the first mixture to first shear and second shear in sequence to obtain a catalyst slurry;

(2) mixing the catalyst slurry with remaining coal tar and hydrogen to form a second mixture and then feeding the second mixture into a suspension-bed hydrogenation reactor for undergoing hydrocracking reaction at a pressure of 19.5 MPa, a temperature of 460° C., a volume ratio of hydrogen to oil controlled at 1100 to obtain a hydrocracked product after 2 h; then feeding the hydrocracked product into the suspension-bed hydrogenation stabilizing reactor, controlling the operating pressure in the suspension-bed hydrogenation reactor to be 19.5 MPa, the temperature to be 440, and the volume ratio of hydrogen to oil to be 1100, and conducting hydrofining in the presence of the suspension-bed hydrogenation stabilizing catalyst to obtain the suspension-bed hydrogenated product after 1.5 h;

(3) subjecting the obtained hydrogenated product to a hot high pressure separation at 19 MPa and 460° C. to obtain a gas stream and an oil stream; after the gas stream exchanges heat with the raw oil, cold hydrogen, oil stream obtained from cold low pressure separation and the air in sequence, conducting cold high pressure separation at 19 MPa and 45° C. to obtain a gas stream and an oil stream, wherein the gas stream can be used as recycle hydrogen, and subjecting the oil stream to cold low pressure separation at 1.5 MPa and 45° C. to obtain a gas stream and an oil stream, wherein the gas stream can be used as fuel while the oil stream is fed into the stripping tower; subjecting the oil stream obtained from the hot high pressure separation to a hot low pressure separation at 1.5 MPa and 430° C. to obtain a gas stream and an oil stream, and separating the gas stream entering the stripping tower and the oil stream obtained from cold low pressure separation at 82° C. to obtain dry gas, naphtha and bottom oil;

(4) subjecting the oil stream obtained from the hot low pressure separation to vacuum distillation, setting the operating temperatures of the first sidestream line, second sidestream line and third sidestream line to be 210° C., 290° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 22.5 MPa, the temperature to be 390° C., the volume ratio of hydrogen to oil to be 500, and the volume space velocity to be 1.2 h$^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 10% of the catalyst slurry and has a particle size of 30 μm-280 μm; the suspension-bed hydrocracking catalyst comprises a composite support and an active metal oxide loaded on the composite support, wherein a mass ratio of the composite support to the active metal contained in the active metal oxide is 100:2.5, the active metal is tungsten, nickel, cobalt and iron; the composite support comprises a semi-coke pore-enlarging material, a molecular sieve and a spent catalytic cracking catalyst in a mass ratio of 4:3.5:4, wherein the semi-coke pore-enlarging material is prepared in the following way: mixing semi-coke and sodium carbonate in a mass ratio of 1:4, activating for 0.5 h at 920° C. by water vapor, performing acid washing and water washing on the enlarged samples, centrifugally separating, and drying for 3 h at 120° C. to obtain the semi-coke pore-enlarging material, wherein the semi-coke pore-enlarging material has an average particle size of 80 μm, a specific surface area of 200 m$^2$/g, an average pore size of 75 nm, and an average pore volume of 2.5 cm$^3$/g; the molecular sieve is β-type molecular sieve, with an average particle size of 2.5 mm, a specific surface area of 280 m$^2$/g, and an average pore size of 6 nm; and the spent catalytic cracking catalyst comprises Y-type molecular sieve, aluminum oxide and metal (nickel, vanadium and iron) in a mass ratio of 20:55:0.5, and has an average particle size of 100 μm, a specific surface area of 250 m²/g, and an average pore size of 4 nm.

In the present embodiment, the suspension-bed hydrogenation stabilizing catalyst is a supported catalyst which comprises aluminum oxide as the supporter and which is loaded with cobalt, molybdenum and tungsten.

Embodiment 6

As shown in FIG. 1, the method for lightening heavy oil by utilizing a suspension-bed hydrogenation process provided by the present embodiment comprises the following steps:

(1) Taking residue oil as the raw oil of the present process, taking half of the residue oil to mix with the suspension-bed hydrocracking catalyst to form a first mixture, and subjecting the first mixture to first shear and second shear in sequence to obtain a catalyst slurry;

(2) mixing the catalyst slurry with remaining residue oil and hydrogen to form a second mixture and feeding the second mixture into a suspension-bed hydrogenation reactor for undergoing hydrocracking reaction at a pressure of 18.5 MPa, a temperature of 450° C., a volume ratio of hydrogen to oil controlled at 900 to obtain a hydrocracked product;

(3) after 2 h, subjecting the hydrogenated product obtained in step (2) to a hot high pressure separation at 18.5 MPa and 440° C. to obtain a gas stream and an oil stream; after the gas stream exchanges heat with the raw oil, cold hydrogen, oil stream obtained from cold low pressure separation and the air in sequence, conducting cold high pressure separation at 18 MPa and 50° C. to obtain a gas stream and an oil stream, wherein the gas stream can be used as recycle hydrogen, and subjecting the oil stream to cold low pressure separation at 1.4 MPa and 50° C. to obtain a gas stream and an oil stream, wherein the gas stream can be used as fuel while the oil stream is fed into the stripping tower; subjecting the oil stream obtained from the hot high pressure separation to a hot low pressure separation at 1.3 MPa and 410° C. to obtain a gas stream and an oil stream, and separating the gas stream entering the stripping tower and the oil stream obtained from cold low pressure separation at 86° C. to obtain dry gas, naphtha and bottom oil;

(4) subjecting the oil stream obtained from the hot low pressure separation to vacuum distillation under normal pressure to obtain a first fraction collected at a temperature of 150° C. to 250° C. and a second fraction collected at a temperature of greater than 250° C., wherein the fraction collected at a temperature of 150° C. to 250° C. is combined with the naphtha while the second fraction is heated and then is subjected to the vacuum distillation, setting the operating temperatures of the first sidestream line, second sidestream line and third sidestream line to be 120° C., 200° C. and 370° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 18.5 MPa, the temperature to be 410° C., the volume ratio of hydrogen to oil to be 1500, and the volume space velocity to be 0.5 h⁻¹, then the fixed-bed hydrogenated product is separated to obtain a light oil product collected at a temperature of less than 350° C., and the tail oil is recycled.

In the present embodiment, the suspension-bed hydrocracking catalyst accounts for 1% of the catalyst slurry and has a particle size of 200 μm-500 μm; the suspension-bed hydrocracking catalyst comprises a composite support and an active metal oxide loaded on the composite support, wherein a mass ratio of the composite support to the active metal contained in the active metal oxide is 10:1, the active metal is tungsten, nickel and cobalt; the composite support comprises a semi-coke pore-enlarging material, a molecular sieve and a spent catalytic cracking catalyst in a mass ratio of 2.5:3.5:1.5, wherein the semi-coke pore-enlarging material is prepared in the following way: mixing semi-coke and sodium carbonate in a mass ratio of 1:2, activating for 0.5 h at 900° C. by water vapor, performing acid washing and water washing on the enlarged samples, centrifugally separating, and drying for 3 h at 100° C. to obtain the semi-coke pore-enlarging material, wherein the semi-coke pore-enlarging material has an average particle size of 60 μm, a specific surface area of 300 m²/g, an average pore size of 70 nm, and an average pore volume of 3 cm³/g; the molecular sieve is Y-type molecular sieve, with an average particle size of 1 mm, a specific surface area of 300 m²/g, and an average pore size of 5 nm; and the spent catalytic cracking catalyst comprises Y-type molecular sieve, aluminum oxide and metal (nickel, vanadium and iron) in a mass ratio of 15:55:0.5, and has an average particle size of 150 μm, a specific surface area of 300 m²/g, and an average pore size of 3 nm.

Embodiment 7

As shown in FIG. 1, the method for lightening heavy oil by utilizing a suspension-bed hydrogenation process provided by the present embodiment comprises the following steps:

(1) Taking residue oil as the raw oil of the present process, taking 40% residue oil to mix with the suspension-bed hydrocracking catalyst to form a first mixture, and subjecting the first mixture to first shear and second shear in sequence to obtain a catalyst slurry;

(2) mixing the catalyst slurry with remaining residue oil and hydrogen to form a second mixture and feeding the second mixture into a suspension-bed hydrogenation reactor for undergoing hydrocracking reaction at a pressure of 20.5 MPa, a temperature of 400° C., a volume ratio of hydrogen to oil controlled at 1200 to obtain a hydrocracked product;

(3) after 1 h, subjecting the hydrogenated product obtained in step (2) to a hot high pressure separation at 19 MPa and 350° C. to obtain a gas stream and an oil stream; after the gas stream obtained from hot high pressure separation exchanges heat with the raw oil, cold hydrogen, oil stream obtained from cold low pressure separation and the air in sequence, conducting cold high pressure separation at 18.5 MPa and 50° C. to obtain a gas stream and an oil stream, wherein the gas stream can be used as recycle hydrogen, and subjecting the oil stream obtained from cold high pressure separation to cold low pressure separation at 1.2 MPa and 40° C. to obtain a gas stream and an oil stream, wherein the gas stream can be used as fuel while the oil stream is fed into the stripping tower; subjecting the oil stream obtained from the hot high pressure separation to a hot low pressure separation at 1.1 MPa and 350° C. to obtain a gas stream and an oil stream, and separating the gas stream entering the stripping tower and the oil stream obtained from cold low pressure separation at 80° C. to obtain dry gas, naphtha and bottom oil;

(4) subjecting the oil stream obtained from the hot low pressure separation to vacuum distillation, setting the operating temperatures of the first sidestream line, second sidestream line and third sidestream line to be 150° C., 260° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, 80 wt % of the third sidestream oil is combined with 10 wt % of the second sidestream oil to serve as a washing liquid for the third sidestream line, the remaining 20 wt % of the third sidestream oil serves as a washing liquid for washing the oil stream and gas stream from the hot low-pressure separation to obtain a washed gas stream and a washing recovery solution, and 30 wt % of the washing recovery solution is recycled for servings as a washing liquid for the hot low pressure separation;

after heat energy recovery, the remaining 90 wt % of the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 20 MPa, the temperature to be 450° C., the volume ratio of hydrogen to oil to be 1000, and the volume space velocity to be 0.7 $h^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 6.5% of the catalyst slurry and has a particle size of 350 μm-500 μm; and the components of the suspension-bed hydrocracking catalyst are the same as those in Embodiment 2 of the present invention.

The solid components and contents in the materials in the hot low pressure separator feed inlet, the hot low pressure separation gas stream outlet, the hot low pressure separation flushing oil collecting tank outlet, the hot low pressure separation oil stream outlet, the vacuum cap gas outlet, the first sidestream oil outlet, the second sidestream oil outlet, the third sidestream oil outlet and the bottom oil outlet are respectively tested in the present embodiment, and the result is as shown in Table 4.

TABLE 4

Solid Components and Contents of Materials at each Inlet and Outlet

| Solid components | Suspension-bed hydrogenation catalyst | Ash content | Asphaltene | Colloid | Metal |
| --- | --- | --- | --- | --- | --- |
| Feed inlet of hot low pressure separator | 10% | 1% | 20% | 15% | 1% |
| Outlet of gas stream obtained from hot low pressure separation | 10 ppm | 1 ppm | 20 ppm | 15 ppm | 1 ppm |
| Hot low pressure separation flushing oil collecting tank outlet | 2% | 0.2% | 4% | 1.5% | 0.2% |
| Outlet of oil stream obtained from hot low pressure separation | 11% | 1.1% | 22% | 16.5% | 1.1% |
| Vacuum cap gas outlet | 1 ppm | 0.1 ppm | 2 ppm | 1.5 ppm | 0.1 ppm |
| First sidestream oil outlet | 2 ppm | 0.2 ppm | 4 ppm | 3 ppm | 0.2 ppm |
| Second sidestream oil outlet | 10 ppm | 1 ppm | 20 ppm | 15 ppm | 1 ppm |
| Third sidestream oil outlet | 1% | 0.1 ppm | 2% | 1.5% | 0.1 ppm |
| Bottom oil outlet | 25% | 2.5% | 50% | 37.5% | 2.5% |

It can be seen from Table 4 that in the case that the feed for the hot low pressure separation contains 10% suspension-bed hydrogenation catalyst, 20% asphaltene, 15% colloid, 1% metal and 1% ash content, by adopting the separation process in step (4) of the present embodiment, the materials at the outlet of gas stream obtained from the hot low pressure separation, vacuum cap gas outlet, first sidestream oil outlet, and second sidestream oil outlet can be ensured to have a relatively low solid content, thereby explaining that the separation process described in the present invention can dramatically improve the quality of the light oil product prepared by the hydrogenation process using a suspension-bed.

Embodiment 8

As shown in FIG. 1, the method for lightening heavy oil by utilizing a suspension-bed hydrogenation process provided by the present embodiment comprises the following steps:

(1) Purification treatment of coal tar

Introducing air into the coal tar, conducting backmixing contact between the semi-coke powder with a particle size of 0.2 mm and a specific surface area of 100 $m^2/g$ and coal tar in a mass ratio of 0.15:1 and adsorbing at 60° C. and 0.8 MPa, wherein the flow of air required for each 1 kg of semi-coke powder is 0.6 $m^3/s$; performing layered settlement after the adsorption to obtain upper-layer material and lower-layer sediment, then subjecting the upper-layer material to a solid liquid separation, wherein the obtained liquid phase is the purified coal tar, while the solid phase is combined with the lower-layer sediment, and the obtained mixture is kneaded with coke powder in a mass ratio of 1:1 to prepare a binder asphalt; compared with the coal tar before purification treatment, the carbon residue in the coal tar after purification in the present embodiment is reduced to 0.11%, reduced by 80%; the content of asphaltene is reduced by 78%; the content of colloid is reduced by 80%; and the content of the heavy metal impurity is reduced by 52%;

(2) Preparation of catalyst slurry

Taking half of the coal tar and injecting into a solvent buffer tank 51, enabling the coal tar to enter a Venturi tube 56 after it is subjected to buffer by the solvent buffer tank 51 and pressurization by the solvent booster pump 58, meanwhile, feeding the suspension-bed hydrocracking catalyst into the Venturi tube 56 from the solid catalyst feeding system 55, subjecting the coal tar and the catalyst to preliminary mixing in the Venturi tube 56 and feeding the mixture into a slurry preparation tank 52, and forming first-level slurry under the stirring effect of the stirrer 54, wherein the temperature in the preparation tank is 90° C. and the pressure therein is normal pressure; and subjecting the first-level slurry to shearing, stirring and mixing via a shear mixer 57 and a slurry mixing tank 53 to finally obtain a catalyst slurry;

(3) Hydrogenation of suspension-bed mixing the catalyst slurry with the remaining coal tar and hydrogen to form a second mixture and feeding the second mixture into a suspension-bed hydrogenation reactor for undergoing hydrocracking reaction at a pressure of 20.5 MPa, a temperature of 430° C., and a volume ratio of hydrogen to oil controlled at 1000 to obtain a hydrocracked product after 1 h;

then feeding a hydrocracked product into a suspension-bed hydrogenation stabilizing reactor, and controlling the operating pressure in the suspension-bed hydrogenation stabilizing reactor to be 20.5 MPa, the temperature to be 380° C., and the volume ratio of hydrogen to oil to be 1100 for hydrogenation refining in the presence of the suspension-bed hydrogenation stabilizing catalyst to obtain the suspension-bed hydrogenated product after 1 h;

(4) subjecting the obtained hydrogenated product to a hot high pressure separation at 20 MPa and 380° C. to obtain a gas stream and an oil stream; after the gas stream obtained from the hot high pressure separation exchanges heat with the raw oil, cold hydrogen, oil stream obtained from cold low pressure separation and the air in sequence, conducting cold high pressure separation at 20 MPa and 50° C. to obtain a gas stream and an oil stream, wherein the gas stream can be used as recycle hydrogen, and subjecting the oil stream obtained from the cold high pressure separation to cold low pressure separation at 1.1 MPa and 50° C. to obtain a gas stream and an oil stream, wherein the gas stream can be used as fuel while the oil stream is fed into the stripping tower; subjecting the oil stream obtained from the hot high pressure separation to a hot low pressure separation at 1 MPa and 380° C. to obtain a gas stream and an oil stream, and separating the gas stream entering the stripping tower and the oil stream obtained from cold low pressure separation at 85° C. to obtain dry gas, naphtha and bottom oil;

(5) subjecting the oil stream obtained from the hot low pressure separation to vacuum distillation, setting the operating temperatures of the first sidestream line, second sidestream line and third sidestream line to be 120° C., 260° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, the third sidestream oil is circulated as its own flushing oil; after heat energy recovery, the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 20 MPa, the temperature to be 350° C., the volume ratio of hydrogen to oil to be 1100, and the volume space velocity to be 1.1 $h^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 6.3% of the catalyst slurry and has a particle size of 80 μm-440 μm; and the components of the suspension-bed hydrocracking catalyst are the same as those in Embodiment 5 of the present invention.

Embodiment 9

As shown in FIG. 1, the method for lightening heavy oil by utilizing a suspension-bed hydrogenation process provided by the present embodiment comprises the following steps:

(1) selecting residue oil as the raw oil of the present process, taking half of the residue oil and mixing with the suspension-bed hydrocracking catalyst to form a first mixture, and subjecting the first mixture to first shear and second shear in sequence to obtain a catalyst slurry;

(2) mixing the catalyst slurry with the remaining residue oil and hydrogen to form a second mixture and feeding the second mixture into a suspension-bed hydrogenation reactor for undergoing hydrocracking reaction at a pressure of 19 MPa, a temperature of 460° C., and a volume ratio of hydrogen to oil controlled at 1000 to obtain a hydrocracked product;

(3) after 2 h, subjecting the hydrogenated product obtained in step (2) to a hot high pressure separation at 18 MPa and 450° C. to obtain a gas stream and an oil stream; after the gas stream obtained from the hot high pressure separation exchanges heat with the raw oil, cold hydrogen, oil stream obtained from cold low pressure separation and the air in sequence, conducting cold high pressure separation at 18 MPa and 40° C. to obtain a gas stream and an oil stream, wherein the gas stream can be used as recycle hydrogen, and subjecting the oil stream obtained from the cold hot pressure separation to a cold low pressure separation at 1.3 MPa and 40° C. to obtain a gas stream and an oil stream, wherein the gas stream can be used as fuel while the oil stream is fed into the stripping tower; subjecting the oil stream obtained from the hot high pressure separation to a hot low pressure separation at 1.3 MPa and 410° C. to obtain a gas stream and an oil stream, and separating the gas stream entering the stripping tower and the oil stream obtained from cold low pressure separation at 82° C. to obtain dry gas, naphtha and bottom oil;

(4) firstly subjecting the oil stream obtained from the hot low-pressure separation to distillation under normal pressure to obtain a first fraction collected at a temperature of 150° C. to 250° C. and a second fraction collected at a temperature of greater than 250° C., wherein the first fraction is combined with the naphtha while the second fraction is heated and then is subjected to the vacuum distillation, setting the operating temperatures of the first sidestream line, second sidestream line and third sidestream line to be 130° C., 240° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, 90 wt % of the third sidestream oil is combined with 5 wt % of the second sidestream oil to serve as a washing liquid for the third sidestream line, the remaining 10 wt % of the third sidestream oil serves as a washing liquid for washing the oil stream and gas stream from the hot low-pressure separation to obtain a washed gas stream and a washing recovery solution, and 60 wt % of the washing recovery solution is recycled for servings as a washing liquid for the hot low pressure separation; after heat energy recovery, the remaining 95 wt % of the second sidestream oil is fed into the fixed-bed hydrogenation reactor together with the first sidestream oil and bottom oil of the stripping tower for hydrocracking and hydrofining again, the operating pressure inside the fixed-bed hydrogenation reactor is controlled to be 18.5 MPa, the temperature to be 450° C., the volume ratio of hydrogen to oil to be 1200, and the volume space velocity to be 1.3 $h^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 3.5% of the catalyst slurry and has a particle size of 300 μm-480 μm; and the components of the suspension-bed hydrocracking catalyst are the same as those in Embodiment 3 of the present invention.

Embodiment 10

As shown in FIG. 1, the method for lightening heavy oil by utilizing a suspension-bed hydrogenation process provided by the embodiment comprises the following steps:

(1) Purification treatment of coal tar

Introducing air into the coal tar, conducting backmixing contact between the semi-coke powder with a particle size of 0.2 mm and a specific surface area of 500 $m^2/g$ and coal tar in a mass ratio of 0.08:1 and adsorbing at 100° C. and 0.2 MPa, wherein the flow of air required for each 1 kg of semi-coke powder is 0.7 $m^3/s$; performing layered settlement after the adsorption to obtain upper-layer material and lower-layer sediment, then subjecting the upper-layer material to a solid liquid separation, wherein the obtained liquid phase is the purified coal tar, while the solid phase is combined with the lower-layer sediment, and the obtained mixture is kneaded with the coke powder in a mass ratio of 0.8:1 to prepare a binder asphalt;

compared with the coal tar before purification treatment, the carbon residue in the coal tar after purification in the present embodiment is reduced to 0.1%, reduced by 81%; the content of asphaltene is reduced by 80%; the content of colloid is reduced by 79%; and the content of the heavy metal impurity is reduced by 51%;

(2) Preparation of catalyst slurry

Please refer to FIG. 2. Taking half of the purified coal tar and injecting into the catalyst preparation tank, when the liquid level reaches the target level, automatically cutting off the liquid flow inlet valve, starting the stirrer of the catalyst preparation tank and simultaneously starting the catalyst circulating pump and the first powder-liquid shear mixer, such that the coal tar in the catalyst preparation tank is subjected to pressurization by the catalyst circulating pump and is mixed with the suspension-bed hydrocracking catalyst of the catalyst feeding system, and the mixture is subjected to first shear mixing in the first powder-liquid shear mixer and then returns to the catalyst preparation tank; and introducing the mixture output from the catalyst preparation tank again into the third liquid separation shear mixer and the catalyst conveying tank in sequence for third shear mixing; then performing second shear mixing in the second shear mixer and outputting into the catalyst mixing tank for mixing again to obtain a catalyst slurry;

(3) Hydrogenation of the suspension-bed mixing the catalyst slurry with the remaining purified coal tar and hydrogen to form a second mixture and feeding the second mixture into a suspension-bed hydrocracking reactor for undergoing hydrocracking reaction at a pressure of 20 MPa, a temperature of 450° C., and a volume ratio of hydrogen to oil controlled at 1200 to obtain a hydrocracked product after 1.5 h; then feeding a hydrocracked product into the suspension-bed hydrogenation stabilizing reactor, controlling the operating pressure in the suspension-bed hydrogenation reactor to be 20 MPa, the temperature to be 410° C., and the volume ratio of hydrogen to oil to be 1200, and conducting hydrofining in the presence of the suspension-bed hydrogenation stabilizing catalyst to obtain the suspension-bed hydrogenated product after 1.5 h;

(4) subjecting the obtained hydrogenated product to a hot high pressure separation at 20 MPa and 400° C. to obtain a gas stream and an oil stream; after the gas stream obtained from the hot high pressure separation exchanges heat with the raw oil, cold hydrogen, oil stream obtained from cold low pressure separation and the air in sequence, conducting cold high pressure separation at 20 MPa and 60° C. to obtain a gas stream and an oil stream, wherein the gas stream can be used as recycle hydrogen, and subjecting the oil stream to cold low pressure separation at 1.4 MPa and 50° C. to obtain a gas stream and an oil stream, wherein the gas stream can be used as fuel while the oil stream is fed into the stripping tower; subjecting the oil stream obtained from the hot high pressure separation to a hot low pressure separation at 1.3 MPa and 380° C. to obtain a gas stream and an oil stream, and separating the gas stream entering the stripping tower and the oil stream obtained from cold low pressure separation at 85° C. to obtain dry gas, naphtha and bottom oil;

(5) firstly subjecting the oil stream obtained from the hot low pressure separation to distillation under normal pressure to obtain a first fraction collected at a temperature of 150° C. to 250° C. and a second fraction collected at a temperature of greater than 250° C., wherein the first fraction is combined with naphtha while the second fraction is heated and then is subjected to the vacuum distillation, setting the operating temperatures of the first sidestream line, second sidestream line and third sidestream line to be 120° C., 260° C. and 350° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, 85 wt % of the third sidestream oil is combined with 20 wt % of the second sidestream oil to serve as a washing liquid for the third sidestream line, the remaining 15 wt % of the third sidestream oil serves as a washing liquid for washing the oil stream and gas stream from the hot low-pressure separation to obtain a washed gas stream and a washing recovery solution, and 90 wt % of the washing recovery solution is recycled for servings as a washing liquid for the hot low pressure separation; after heat energy recovery, the remaining 80 wt % of the second sidestream oil is fed into the fixed-bed hydrogenation reactor together with the first sidestream oil and bottom oil of the stripping tower for hydrocracking and hydrofining again, the fixed-bed hydrogenation reactor is operated at a pressure of 18.5 MPa, a temperature of 440° C., a volume ratio of hydrogen to oil being 1000, and a volume space velocity of 1.5 $h^{-1}$, then the fixed-bed hydrogenated product is separated to obtain the light oil product obtained at a temperature of less than 350° C., and the tail oil is recycled.

In the present embodiment, the suspension-bed hydrocracking catalyst accounts for 5.9% of the catalyst slurry and has a particle size of 250 μm-500 μm; and the components of the suspension-bed hydrocracking catalyst are the same as those in Embodiment 5 of the present invention.

Embodiment 11

As shown in FIG. 1, the method for lightening heavy oil by utilizing a suspension-bed hydrogenation process provided by the embodiment comprises the following steps:

(1) Purification treatment of coal tar

Introducing air into the coal tar, conducting backmixing contact between the semi-coke powder with a particle size of 0.2 mm and a specific surface area of 300 m²/g and coal tar in a mass ratio of 0.2:1 and adsorbing at 80° C. and 1 MPa, wherein the flow of air required for each 1 kg of semi-coke powder is 0.8 m³/s; performing layered settlement after the adsorption to obtain upper-layer material and lower-layer sediment, then subjecting the upper-layer material to a solid liquid separation, wherein the obtained liquid phase is the purified coal tar, while the solid phase is combined with the lower-layer sediment, and the obtained mixture is kneaded with coke powder in a mass ratio of 0.9:1 to prepare a binder asphalt;

compared with the coal tar before purification treatment, the carbon residue in the coal tar after purification in the present embodiment is reduced to 0.12%, reduced by 83%; the content of asphaltene is reduced by 81%; the content of colloid is reduced by 80%; and the content of the heavy metal impurity is reduced by 50%;

(2) Preparation of catalyst slurry

Taking half of the purified coal tar and injecting into the catalyst preparation tank, when the liquid level reaches the target level, automatically cutting off the liquid flow inlet valve, starting the stirrer of the catalyst preparation tank and simultaneously starting the catalyst circulating pump and the first powder-liquid shear mixer, such that the coal tar in the catalyst preparation tank is subjected to pressurization by the catalyst circulating pump and is mixed with the suspension-bed hydrocracking catalyst of the catalyst feeding system, and the mixture is subjected to first shear mixing in the first powder-liquid shear mixer and then returns to the catalyst preparation tank; and introducing the mixture output from the catalyst preparation tank again into the second powder-liquid shear mixer for second shear mixing; then conveying the mixture into the catalyst mixing tank for mixing again to obtain a catalyst slurry;

(3) Hydrogenation of suspension-bed mixing the catalyst slurry with the remaining residue oil and hydrogen to form a second mixture and feeding the second mixture into a suspension-bed hydrogenation reactor for undergoing a hydrocracking reaction at a pressure of 20.8 MPa, a temperature of 430° C., and the volume ratio of hydrogen to oil controlled at 1300 to obtain a hydrocracked product after 1.5 h; then feeding a hydrocracked product into the suspension-bed hydrogenation stabilizing reactor, controlling the operating pressure in the hydrogenation stabilizing reactor to be 20.8 MPa, the temperature to be 400° C., and the volume ratio of hydrogen to oil to be 1300 for hydrofining in the presence of the suspension-bed hydrogenation stabilizing catalyst, so as to obtain the suspension-bed hydrogenated product after 1 h;

(4) subjecting the obtained hydrogenated product to a hot high pressure separation at 20.5 MPa and 400° C. to obtain a gas stream and an oil stream; after the gas stream obtained from the hot high pressure separation exchanges heat with the raw oil, cold hydrogen, oil stream obtained from cold low pressure separation and the air in sequence, conducting cold high pressure separation at 20 MPa and 50° C. to obtain a gas stream and an oil stream, wherein the gas stream can be used as recycle hydrogen, and subjecting the oil stream to cold low pressure separation at 1.5 MPa and 50° C. to obtain a gas stream and an oil stream, wherein the gas stream can be used as fuel while the oil stream is fed into the stripping tower; subjecting the oil stream obtained from the hot high pressure separation to a hot low pressure separation at 1.4 MPa and 380° C. to obtain a gas stream and an oil stream, and separating the gas stream entering the stripping tower and the oil stream obtained from cold low pressure separation at 90° C. to obtain dry gas, naphtha and bottom oil;

(5) firstly subjecting the oil stream obtained from the hot low-pressure separation to distillation under normal pressure to obtain a first fraction collected at a temperature of 150° C. to 250° C. and a second fraction collected at a temperature of greater than 250° C., wherein the first fraction is combined with the naphtha while the second fraction is heated and then is subjected to the vacuum distillation, setting the operating temperatures of the first sidestream line, second sidestream line and third sidestream line to be 150° C., 270° C. and 370° C. respectively, to respectively obtain first sidestream oil (with the major fraction being light wax oil and heavy diesel), second sidestream oil (with the major fraction being wax oil), third sidestream oil (with the major fraction being wax oil) and residue, wherein the residue is used for producing asphalt, 88 wt % of the third sidestream oil is combined with 15 wt % of the second sidestream oil to serve as a washing liquid for the third sidestream line, the remaining 12 wt % of the third sidestream oil serves as a washing liquid for washing the oil stream and gas stream from the hot low pressure separation to obtain a washed gas stream and a washing recovery solution, and 70 wt % of the washing recovery solution is recycled for servings as a washing liquid for the hot low pressure separation; after heat energy recovery, the remaining 85 wt % of the second sidestream oil is fed into the fixed-bed hydrogenation reactor together with the first sidestream oil and the bottom oil of the stripping tower for hydrocracking and hydrofining again, the operating pressure inside the fixed-bed hydrogenation reactor is controlled to be 20.5 MPa, the temperature to be 450° C., the volume ratio of hydrogen to oil to be 1000, and the volume space velocity to be 1.3 h$^{-1}$, then the fixed-bed hydrogenated product is separated to obtain a light oil product collected at a temperature of less than 350° C., and the tail oil is recycled.

In the present embodiment, the suspension-bed hydrocracking catalyst accounts for 8.1% of the catalyst slurry and has a particle size of 300 μm-490 μm; and the suspension-bed hydrocracking catalyst and the components of the suspension-bed hydrocracking catalyst are both the same as those in Embodiment 5 of the present invention.

In the present embodiment, the bottoms of the two suspension-bed hydrogenation reactors are both provided with a drainage system in a connecting manner, and the drainage system comprises a drain pipeline, a cooling and separating system, a flare system and a raw oil recycling system, wherein one end of the drain pipeline is connected with the bottom of the suspension-bed hydrogenation reactor, and the other end of the drain pipeline is connected with the cooling and separating system; in the hydrogenation process using a suspension-bed, when the temperature of the suspension-bed hydrogenation reactor instantly rises and exceeds a normal reaction temperature, the feed valve of the suspension-bed hydrogenation reactor is closed and a drain valve bank in the cooling and separating system is opened, such that materials in the suspension-bed hydrogenation reactor are depressurized to 1.0 MPa via a decompression orifice plate arranged on the drain pipeline, then materials are discharged into the drainage tank of the cooling and separating system to mix with the flushing oil in the drainage tank for cooling, wherein the cooled liquid-solid two-phase material is discharged into the raw oil recycling system via a blow-down pipeline which is connected to the bottom of the drainage tank; and the cooled gas-phase material enters an emergency gas discharge air cooler via a gas discharge pipeline connected to the top of the drainage tank for undergoing cooling and liquid separation to obtain a gas-phase material and a liquid-phase material, wherein the gas-phase material is fed into the flare system, and the liquid-phase material is sent back to the drainage tank and finally discharged to the raw oil recycling system, thereby ensuring emergency drainage of the suspension-bed hydrogenation reactor.

Embodiment 12

The present embodiment provides a device for lightening heavy oil by utilizing a suspension-bed hydrogenation process, as shown in FIG. 1, the device comprises a raw oil pretreatment unit, a catalyst slurry preparation unit, a suspension-bed hydrogenation unit, a separation unit and a fixed-bed hydrogenation unit which are connected in sequence.

Figure 3:
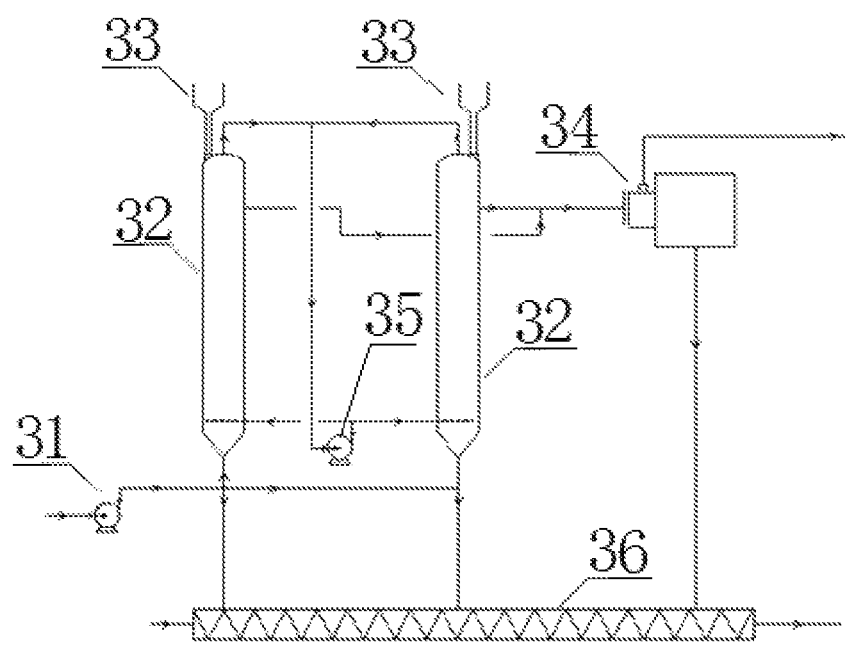
FIG. 3 is a structure diagram of the raw oil pretreatment unit.

Please refer to FIG. 3. The raw oil pretreatment unit comprises at least one adsorption device 32, a draught fan 35, a liquid solid separation device 34 and a kneading device 36, the lower part of the adsorption device 32 is provided with an oil inlet and a gas inlet, an oil pump 31 is connected with the oil inlet of the adsorption device, the upper part of the adsorption device 32 is provided with an oil outlet, a gas outlet and an adsorbent inlet, an adsorbent adding device 33 is connected with the adsorbent inlet, and is specifically an adsorbent adding groove; the draught fan 35 is provided with an extraction opening and an exhaust port, wherein the extraction opening is communicated with the gas outlet of the adsorption device 32, and the exhaust port is connected with the gas inlet of the adsorption device 32; the liquid solid separation device 34 is provided with an inlet, a solid phase outlet and a liquid phase outlet, the inlet is communicated with the oil outlet of the adsorption device 32, the liquid phase outlet is connected with a first solvent inlet and/or a second solvent inlet; the feed inlet of the kneading device 36 is respectively communicated with the slag discharge opening arranged at the bottom of the adsorption device 32 and a solid phase outlet of the liquid solid separation device 34. In the present embodiment, as shown in FIG. 3, the adsorption devices 32 are two adsorption towers, when the former adsorption tower is saturated after adsorption, it can be switched to the latter adsorption tower for adsorption, and during the adsorption process of the latter adsorption tower, the former adsorption tower is filled with adsorbent, after the latter adsorption tower is saturated after adsorption, and it can be switched to the former adsorption tower again for adsorption, therefore, it is simple and convenient by adsorbing in a cycle like this. The liquid solid separation device 34 in the present embodiment is a centrifugal machine, of course, in other embodiments, the liquid solid separation device 34 can also be a filter, such as a plate-and-frame filter or an automatic backwashing filter.

As shown in FIG. 2, the catalyst slurry preparation unit comprises a first shear agitation unit 1, a third shear agitation unit 2 and a second shear agitation unit 3. In the present embodiment, the first shear agitation unit 1 comprises a catalyst preparation tank 21, a catalyst circulating pump 26, a first powder-liquid shear mixer 24 and a first catalyst feeding system 28, wherein the catalyst preparation tank is provided with a first solvent inlet and a first slurry inlet on the side wall thereof, and with a first slurry outlet at the bottom thereof, wherein the first slurry outlet is connected with a liquid flow inlet of the first powder-liquid shear mixer 24 via the catalyst circulating pump 26, a solid material inlet of the first powder-liquid shear mixer 24 is communicated with the first catalyst feeding system 28, and a slurry outlet of the first powder-liquid shear mixer 24 is connected with the first slurry inlet of the catalyst preparation tank; the third shear agitation unit 2 comprises a catalyst conveying tank 22, a third powder-fluid shear mixer 27, a second catalyst feeding system 20 and a catalyst circulating pump 26; a second solvent inlet and a second slurry inlet are respectively arranged on the side wall of the catalyst conveying tank 22, and a second slurry outlet is arranged at the bottom thereof, the liquid flow inlet of the third powder-liquid shear mixer 27 is connected with the second slurry outlet or the first slurry outlet via the catalyst circulating pump 26, the solid material inlet of the third powder-liquid shear mixer 27 is communicated with the second catalyst feeding system 20, and the slurry outlet of the third powder-liquid shear mixer 27 is connected with the second liquid flow inlet, and the second slurry outlet is also connected with the catalyst mixing tank 29 via the second powder-liquid shear mixer 25; the second shear agitation unit 3 comprises a second powder-liquid shear mixer 25 and a catalyst mixing tank 29, wherein the first slurry outlet is connected with the catalyst mixing tank 29 via the second powder-liquid shear mixer 25; a stirrer 23 is arranged at the lower part of the catalyst preparation tank 21, the catalyst conveying tank 22 and/or the catalyst mixing tank 9, and the stirrer 23 comprises two layers of spiral impellers.

As shown in FIG. 1, the suspension-bed hydrogenation unit comprises a suspension-bed hydrocracking reactor 5 and a suspension-bed hydrogenation stabilizing reactor 6 which are connected in series. The slurry inlet of the suspension-bed hydrocracking reactor 5 is connected with the discharge hole of the catalyst mixing tank 29, and the slurry outlet of the suspension-bed hydrogenation stabilizing reactor 6 is communicated with the feed inlet of the hot high pressure separator 7. Please refer to FIG. 6, the suspension-bed hydrocracking reactor 5 and the suspension-bed hydrogenation stabilizing reactor 6 in the present embodiment both have the following structures:

a reactor shell 41, a liquid phase circulating pipe 43 arranged in the reactor shell 41 and an inlet jet flow distributor; wherein the reactor shell 41 is arranged vertical to the horizontal direction, a plurality of cold hydrogen inlets are arranged on the side wall of the reactor shell 41, the reactor shell 41 is provided with a liquid flow inlet 42 at the bottom thereof, and a liquid outlet on the top thereof; both ends of the liquid phase circulating pipe 43 are opened, an upper opening end of the liquid phase circulating pipe 43 extends to the top of the reactor shell 41, a cold oil injection port arranged at the top of the reactor shell 41 is arranged just above the liquid phase circulating pipe 43, a diffuser 47 is connected with the lower end of the liquid phase circulating pipe 43, the maximum diameter of the diffuser 47 is greater than that of the flow deflector 45, a liquid return channel 48 is formed between the side wall of the diffuser 47 and the flow deflector 45; the inlet jet flow distributor comprises an annular boss 44 and a flow deflector 45, wherein the annular boss 44 is arranged on the inner side wall, close to the liquid flow inlet 42, of the reactor shell 41, and has an inner diameter which firstly decreases and then increases along an axial direction of the reactor; a flow deflector 45 is arranged above the liquid flow inlet 42, wherein the flow deflector 45 has a revolved body which has an outer diameter being firstly increased and then decreased along its axial direction with its maximum outer diameter greater than a diameter of the liquid phase circulating pipe 43; a liquid inlet passage 46 is formed between the flow deflector 45 and the annular boss 44, and a portion of the flow deflector 45 where the outer diameter of the flow deflector reaches a maximum is arranged opposite to a portion of the annular boss where the inner diameter of the annular boss 44 reaches a minimum such that the liquid inlet passage 46 has a caliber of a minimum size. In the present embodiment, the annular boss 44 has a longitudinal section which has a trapezoid shape laterally arranged along the axial direction of the reactor shell 41, and a waistline of the trapezoid and the side wall of the reactor shell 41 define an included angle of 45°, and in other embodiments, the included angle can be in a range of 15-75°; in another embodiment, the annular boss 44 has an arch shaped longitudinal section along the axial direction of the reactor shell 41, and a tangent at an intersection point of the arch and the reactor shell 41 and the side wall of the reactor shell 41 define an included angle of 15-75°.

The separation unit comprises a hot high pressure separator 7, a hot low pressure separator 14, a cold high pressure separator 12, a cold low pressure separator 13, a stripping tower 15, an atmospheric tower, a vacuum tower 16 and a heat exchange unit, wherein the hot high pressure separator 7 has a gas stream outlet which is connected with the feed inlet of the cold high pressure separator 13, and has an oil stream outlet which is connected with the feed inlet of the hot low pressure separator 14; the cold high pressure separator 12 has an oil stream outlet which is connected with the feed inlet of the cold low pressure separator 13, the cold low pressure separator 13 has an oil stream outlet which is connected with the feed inlet of the stripping tower 15; the hot low pressure separator 14 has a gas stream outlet which is communicated with the feed inlet of the stripping tower 15, and has an oil stream outlet which is connected with the feed inlet of the atmospheric tower, an atmospheric residue outlet is arranged at the bottom of the atmospheric tower, and the atmospheric residue outlet is connected with the feed inlet of the vacuum tower 16 via an adsorption tank, an exhaust port is arranged on the top of the atmospheric tower, and the exhaust port is communicated with the heavy naphtha collecting tank; the heat exchange unit comprises a first heat exchanger 8, a second heat exchanger 9, a third heat exchanger 10 and an air cooler 11 which are connected in series in sequence, and the gas stream obtained from the hot high pressure separation exchanges heat with the raw oil in the first heat exchanger 8, the gas stream obtained from the hot high pressure separation exchanges heat with cold hydrogen in the second heat exchanger 9, while the gas stream obtained from the hot high pressure separation exchanges heat with the gas stream obtained from the cold low pressure separation in the third heat exchanger 10.

Figure 4:
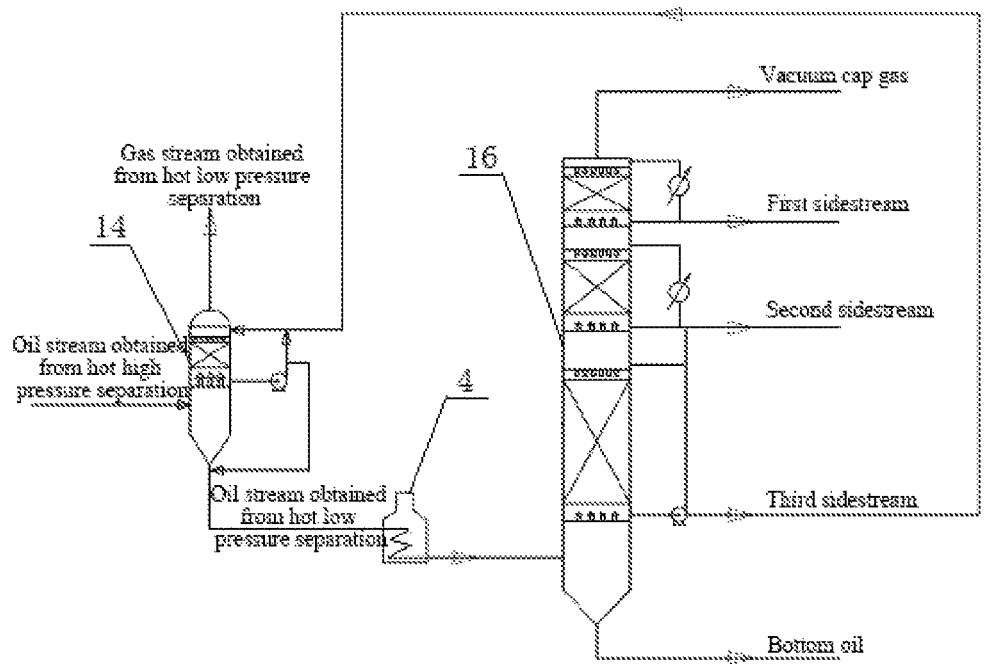
FIG. 4 is a structure diagram of the hot low pressure separator and the vacuum tower.

Please refer to FIG. 4. The hot low pressure separator 14 is provided with a washing section of the hot low pressure separator, the washing section of the hot low pressure separator is arranged between the feed inlet of the hot low pressure separator 14 and the gas stream outlet of the hot low pressure separator, and the washing section of the hot low pressure separator is provided with a washing liquid inlet and a washing liquid outlet, and the washing liquid outlet of the hot low pressure separator is respectively connected with a washing liquid inlet of the hot low pressure separator and the oil stream outlet of the hot low pressure separator; the top and the bottom of the vacuum tower 16 are respectively provided with a vacuum cap gas outlet and a vacuum residue outlet, a feed inlet is further arranged on the side wall of the vacuum tower 16, and the feed inlet is communicated with the oil stream outlet of the hot low pressure separator via a combustion furnace 4; a first washing section for the first sidestream line, a second washing section for the second sidestream line and a third washing section for the third sidestream line are arranged in sequence in the vacuum tower and above the top of the feed inlet of the vacuum tower from top to bottom, wherein a third washing section for the third sidestream line is provided with a washing liquid inlet for the third sidedstream line and a third sidestream oil outlet; the third sidestream oil outlet is respectively communicated with a washing liquid inlet for the third sidedstream line, a washing liquid inlet for the hot low pressure separator and a third sidestream oil collecting device; the second washing section for the second sidestream line is provided with a washing liquid inlet for the second sidestream line and a second sidestream oil outlet, and the second sidestream oil outlet is respectively connected with the washing liquid inlet of the second sidestream line, the washing liquid inlet of the third sidestream line and the second sidestream oil collecting device; and the washing section for the first sidestream line is provided with a washing liquid inlet of the first sidestream line and a first sidestream oil outlet, and the first sidestream oil outlet is respectively connected with the washing liquid inlet of the first sidestream line and the first sidestream oil collecting device; and an asphalt forming plant is connected to the vacuum residue outlet. In the present embodiment, the washing section of the hot low pressure separator, the washing section for the first sidestream line, the washing section for the second sidestream line and the washing section for the third sidestream line all include a washing liquid distributor, a filler and a flushing oil collecting tank which are arranged from top to bottom in sequence, an inclined plane is arranged at the bottom of the flushing oil collecting tank, the included angle between the inclined plane and the horizontal direction is 5-30°, and the flushing oil outlet of the hot low pressure separator, the first sidestream oil outlet, the second sidestream oil outlet and the third sidestream oil outlet are all arranged at the lowest position of the incline plane in their respective corresponding flushing oil collecting tank, so as to ensure that solid particles are not deposited in the flushing oil collecting tank.

The fixed-bed hydrogenation unit comprises a fixed-bed hydrogenation reactor and a separation tower, wherein the feed inlet of the fixed-bed hydrogenation reactor is respectively connected with a bottom oil outlet of the stripping tower 15, a first sidestream oil outlet and a second sidestream oil outlet of the vacuum tower 16, and the discharge hole of the fixed-bed hydrogenation reactor is communicated with the separation tower, and the separation tower is provided with a light oil outlet and a tail oil outlet.

The working principle of the raw oil pretreatment unit in the present embodiment is as follows: with coal tar as an example, the coal tar is pressurized and sent into an adsorption tower via the lower part of the adsorption tower, the adsorbent is added into an adsorption tower for multiple times intermittently via the adsorbent inlet, and meanwhile a draught fan is utilized to extract air at the top part of the adsorption tower, and gas is returned to the lower part of the adsorption tower, so as to form bubbles in the adsorption tower, and the adsorbent is in a state of constant backmixing in the adsorption tower in a manner of bubble stirring, thereby increasing the solid-liquid mixing effect in the adsorption tower, and achieving the purpose of sufficiently adsorbing the colloid, asphaltene and other solid impurities in the coal tar; after saturated adsorption, the lower-layer slurry after sediment is discharged into a kneading device from the bottom of the adsorption tower, the coal tar after adsorption treatment is introduced into the liquid solid separation device from the top of the adsorption tower for solid liquid separation, so as to remove the solid particles therein to obtain the solid phase and the liquid phase, while the liquid phase is the purified coal tar. By utilizing the kneading device, the lower-layer slurry, the solid phase and pulverized coal and/or coke powder are subjected to extrusion forming to form a binder asphalt.

The working principle of the catalyst slurry preparation unit in the present embodiment is as follows: the solvent is added into the catalyst preparation tank, when the liquid level in the preparation tank reaches a designated liquid level, the adding of solvent is stopped, the catalyst circulating pump and the first powder shear mixer are started, after pressurization via the catalyst circulating pump, the solvent in the catalyst preparation tank is preliminarily mixed with the solid catalyst from the catalyst feeding system under the shear mixing effect of the first powder-liquid shear mixer, and then the mixture returns to the catalyst preparation tank, solvent is added continuously and stirred, then the above first shear mixing is cycled for many times; after the solid content and solid dispersion degree in the slurry prepared by the first shear mixing unit reach a preset requirement, the second powder-liquid shear mixer is started, then the slurry prepared in the first shear mixing unit is further subjected to shear, mixing and pressurization and is conveyed to the catalyst mixing tank, thereby realizing high dispersion and mixing of the catalyst and the solvent and realizing the preparation of the catalyst slurry. In the above process, the third shear agitation unit or can be used as a strengthened mixing mechanism of the first shear agitation unit, and the solid-liquid material which is subjected to slurry preparation by the first shear agitation unit is further dispersed and mixed by the third shear agitation unit, or can be used as a standby mechanism of the first shear agitation unit during slurry discharge or in a failure, thereby ensuring uninterrupted preparation of the catalyst slurry to improve system efficiency. To prevent errors, the amount of catalyst should be calculated before each preparation.

The working principle of the suspension-bed reactor in the present embodiment is as follows: the heavy liquid material containing catalyst enters a suspension-bed reactor from the liquid flow inlet and enters the cavity outside the liquid phase circulating pipe via the liquid inlet passage, the heavy liquid material is subjected to hydrogenation reaction in the presence of a catalyst and hydrogen; as the reaction goes on, the heavy raw material is cracked into light components with a small density, and the light components will move upwards together with the hydrogen and reach the top of the reactor, a part of the light components enter the liquid phase circulating pipe via the upper end of the liquid phase circulating pipe, flow from top to bottom in the liquid phase circulating pipe under the effect of gravity, and are distributed evenly into the outside space at the bottom of the liquid phase circulating pipe by the flow deflector when such light components are close to the outlet at the lower end of the liquid phase circulating pipe, thereby achieving the purpose of sufficiently mixing with the heavy raw material at the bottom of the reactor and further enhancing backmixing of the materials in the reactor, such that continuous liquid phase circulation is formed in the suspension-bed reactor, which is not only beneficial for improving liquid phase linear speed inside the reactor for convenience of coke discharge, but also beneficial for reducing axial temperature difference in the reactor, and the heat discharged from the reaction is used for heating materials fed at the inlet, so as to reduce the raw material temperature at the reactor liquid flow inlet. The reasons for realizing liquid phase self-circulation by the suspension-bed reactor in the present embodiment are as follows: the circulating power is mainly provided in the following two ways: (1) the existence of the inlet jet flow distributor which can convert the pressure energy of the inlet material into circulating kinetic energy; and (2) the density difference between the inside and outside of the liquid phase circulating pipe caused by difference in gas holdup, namely, the density of the flow inside the liquid phase circulating pipe is greater than the density of the liquid-gas mixed phase outside the liquid phase circulating pipe, and the existence of the density difference effectively promotes the self circulation of the liquid phase in the reactor.

Embodiment 13

On the basis of Embodiment 12 of the present invention, the device for lightening heavy oil by utilizing a suspension-bed hydrogenation process provided by the embodiment adopts the catalyst slurry preparation unit shown in FIG. 5 to replace the catalyst slurry preparation unit shown in FIG. 2.

As shown in FIG. 5, the first shear agitation unit 1 comprises a solvent booster pump 58, a Venturi tube 56, a solid catalyst feeding system 55 and a slurry preparation tank 52, wherein the Venturi tube 56 is provided with a solvent inlet at one end thereof, a slurry outlet at the other end thereof, and a catalyst inlet formed on a sidewall thereof, wherein the catalyst inlet is connected with the solid catalyst feeding system 55, the solvent inlet is communicated with the solvent booster pump 58, a solvent buffer tank is connected with the inlet of the solvent booster pump 58; the side wall of the slurry preparation tank 52 is respectively provided with a solvent inlet and a slurry inlet, while the bottom thereof is provided with a slurry outlet, and the slurry inlet is connected with the slurry outlet of the Venturi tube 56; the second shear agitation unit 2 comprises a shear mixer 57 and a slurry mixing tank 53, the slurry outlet of the slurry preparation tank 52 is connected with the slurry mixing tank 53 via the shear mixer 57; and a stirrer 54 is respectively arranged in a lower part of the slurry preparation tank 52 and the slurry mixing tank 53, the stirrer 54 comprises two layers of spiral impellers, and a rotational speed of a main shaft of the stirrer is 100-300 r/min.

Embodiment 14

Figure 6:
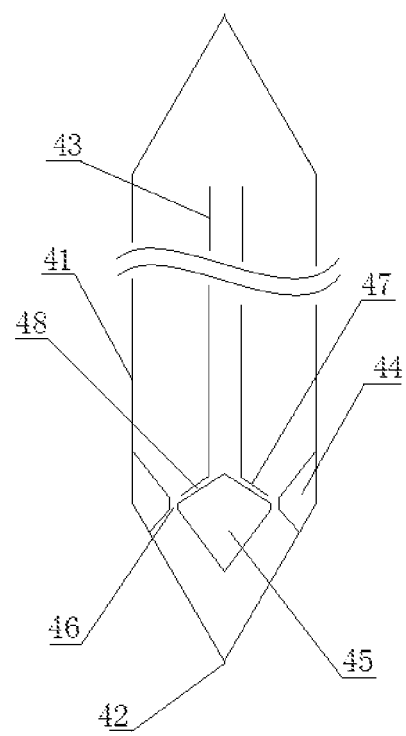
FIG. 6 is a structure diagram of the suspension-bed reactor in Embodiment 12.
Figure 7:
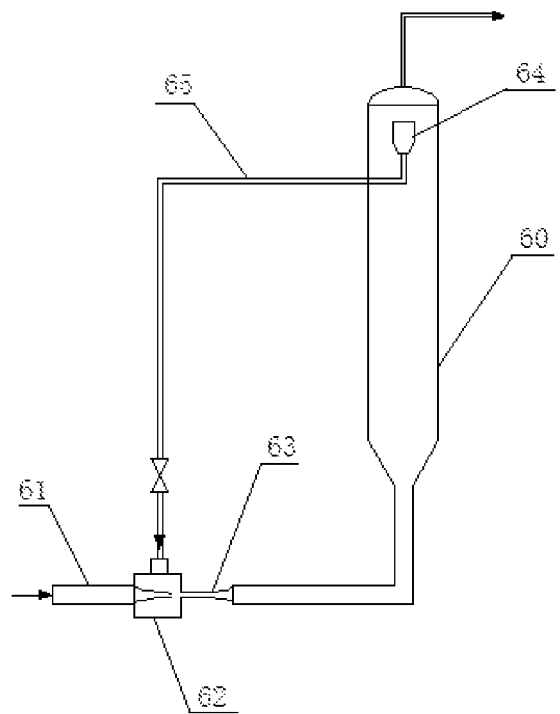
FIG. 7 is a structure diagram of the suspension-bed reactor in Embodiment 14.

On the basis of Embodiment 12 of the present invention, the device for lightening heavy oil by utilizing a suspension-bed hydrogenation process provided by the embodiment adopts the suspension-bed reactor shown in FIG. 7 to replace the suspension-bed reactor shown in FIG. 6.

As shown in FIG. 7, the suspension-bed reactor in the present embodiment comprises a vertically arranged reactor barrel body 60, a jet device and a liquid receiver 64, wherein the reactor barrel body 60 is provided with an inlet at the bottom, and with an outlet at the top;

the jet device is arranged outside the reactor barrel body 60 and comprises a nozzle 61, a suction chamber 62 and a diffuser 63, and the diffuser 63 is connected with the inlet of the reactor barrel body 60;

the liquid receiver 64 is arranged in the reactor barrel body 60 and is close to the outlet of the reactor barrel body 60, and the top of the liquid receiver 64 is opened to obtain the liquid phase at the top of the reactor barrel body 60, a liquid return pipe 65 is communicated at the bottom of the liquid receiver 64, and the other end of the liquid return pipe 65 is communicated with the suction chamber 62; a discharge hole is further arranged on the top of the liquid receiver 30, and the discharge hole is connected with the gas liquid separator.

In other embodiments, the liquid receiver 64 can also be arranged outside the reactor barrel body 60, the liquid receiver 64 is provided with a feed inlet which is communicated with the outlet of the reactor barrel body 60. Heavy components continuously enter the suspension-bed reactor, thereby providing a power for enabling the heavy components generated in the reaction to enter the liquid receiver; the feed inlet of the liquid receiver 64 is higher than the outlet of the reactor barrel body 60, and the distance between the feed inlet and the bottom of the liquid receiver 64 is ½-9/10 of the height of the liquid receiver 64, to ensure the separation effect of the liquid phase and the gas phase in the liquid receiver.

Embodiment 15

Figure 8:
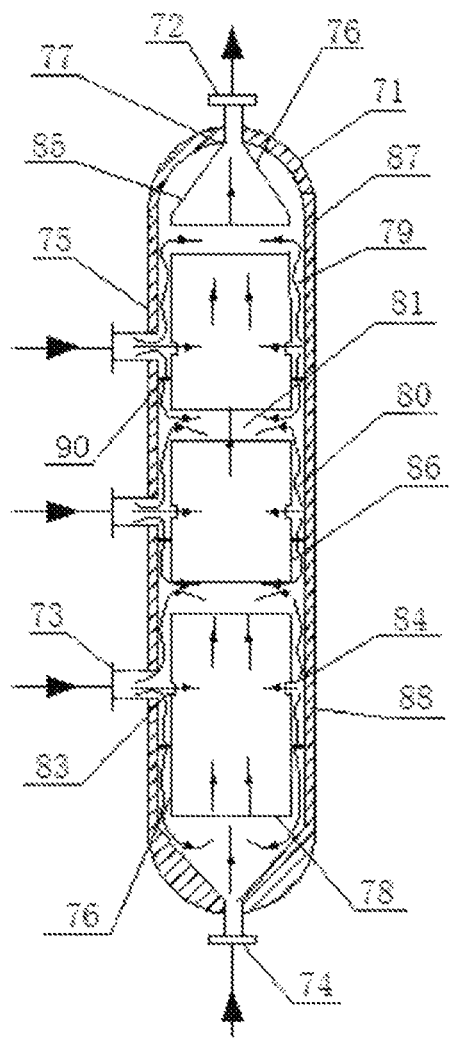
FIG. 8 is a structure diagram of the suspension-bed reactor in Embodiment 15; wherein the reference numerals are as follows.

On the basis of Embodiment 12 of the present invention, the suspension-bed hydrogenation device for lightening heavy oil by utilizing a suspension-bed hydrogenation process provided by the present embodiment adopts the suspension-bed reactor shown in FIG. 8 to replace the suspension-bed reactor shown in FIG. 6.

As shown in FIG. 8 (the direction shown by the arrows in the figure is the flow direction of materials or the flow direction of cold hydrogen), the suspension-bed reactor in the present embodiment comprises a reactor body 71, wherein the reactor body 71 is provided with a reaction product outlet 72 on the top thereof, a cold hydrogen inlet 73 on the side wall thereof, and a feed inlet 74 at the bottom thereof, and the reactor body 71 is provided with a shell 75, a surfacing layer 88 and an insulated lining 87 in sequence from outside to inside; the suspension-bed reactor in the present embodiment is further provided with a lining barrel 76 fixedly arranged inside the reactor body 71. In the present embodiment, the lining barrel 76 is provided with a conical barrel 85 and a plurality of annular barrels 86, the conical barrel 85 is communicated with the inside of the annular barrels 86, the outlet 77 arranged on the top of the conical barrel 85 is in sealing connection with the reaction product outlet 72, a plurality of annular barrels 86 are arranged below the conical barrel 85 in sequence from top to bottom, a side wall of the annular barrel 86 is fixed onto the inner side wall of the reactor body 71. In the present embodiment, the fixed mechanism is a bracket 90 arranged on the inner side wall of the reactor body 71, the annular barrel 76 is fixedly connected with the bracket 90 to realize the fixing of the annular barrel 76, the cavity 79 defined between a side wall of the annular barrel 86 and the inner side wall of the reactor body 71 is the first circulating passage 80, the gap between the conical barrel 85 and the annular barrel 86 adjacent thereto and the gap between two adjacent annular barrels 86 constitute the second circulating passage 81, the bottom of the lowest annular barrel 86 is communicated with the feed inlet 74, the space between the side wall of the annular barrel 86 above the cold hydrogen inlet 73 and the inner side wall of the reactor body 71 is smaller than the space between the side wall of the annular barrel 86 below the cold hydrogen inlet 73 and the inner side wall of the reactor body 71, a first gas hole 83 is arranged on the side wall of the annular barrel 86 opposite to the cold hydrogen inlet 73, and a second gas hole 84 is arranged on the side wall of the annular barrel 86 opposite to the first gas hole 83. In the present embodiment, the reactor body 71 is a vertically arranged barrel body, the shell 75 is a metal shell, the thickness of the wall of the shell 75 is 300 mm, the thickness of the surfacing layer 88 is 15 mm, the thickness of the insulated lining 87 is 200 mm, and the thickness of the wall of the lining barrel 76 is 15 mm.

In the above embodiment, the lining barrel 76 is set to be constituted by the conical barrel 85 and a plurality of annular barrels 86, the top of the lining barrel 76 is set to be a conical barrel 85, and the top of the conical barrel 85 is in sealing connection with the reaction product outlet 72, the materials in the lining barrel 76 are convenient to be conveyed out into a follow-up device via the conical barrel 85 and the reaction product outlet 72, the side wall of the lining barrel 76 is arranged to be constituted by a plurality of annular barrels 86 from top to bottom, the gap between the conical barrel 85 and annular barrel 86 adjacent thereto or the gap between two adjacent annular barrels 86 is the second circulating passage 81, thereby ensuring to form a gap around the annular of the lining barrel 76 on the side wall of the lining barrel 76, the annular gap is the second circulating passage 81 of the lining barrel 76, a strong disturbed flow is generated at the second annular circulating passage 81 by the cold hydrogen fluid between the lining barrel 76 and the reactor body 71 due to the flow generated by reduced pressure near the first gas hole 83 and the second gas hole 84, meanwhile, due to a plurality of second annular circulating passages 81 formed by the plurality of annular barrels 86, multi-segment disturbed flow inside the reactor is realized in the whole process, the process of rapidly mixing hydrogen with the oil products is completed, also the even mixing of catalyst particles and oil products is promoted. The space between the side wall of the annular barrel 86 arranged at the top of the cold hydrogen inlet 73 and the inner side wall of the reactor body 71 is made smaller than the space between the side wall of the annular barrel 86 arranged at the lower part of the cold hydrogen inlet 73 and the inner side wall of the reactor body 71, so as to ensure that the first annular passage 80 becomes larger gradually from top to bottom, control part of the entered cold hydrogen to flow to the lower part of the reactor body 71, such that sufficient cold hydrogen is introduced into the lower part of the reactor body 71, to ensure even mixing of cold hydrogen and materials at the lower part of the reactor body 71 and ensure even temperature of the materials. As a first gas hole 83 is formed on the side wall of the circular barrel 86 opposite to the cold hydrogen inlet 73, and a second gas hole 84 is formed on the side wall of the first gas hole 83 opposite to the side wall of the annular barrel 86, when cold hydrogen enters the annular barrel 86 via the first gas hole 83 and the second gas hole 84, it is ensured that the process of the flowing of cold hydrogen is a process in which the pore diameter changes from large to small, so that the flow rate increases gradually, then the static energy of cold hydrogen fluid is transformed to kinetic energy, when flowing through the minimum point of the pore diameter, the flow rate of the cold hydrogen fluid is the highest, the pressure is the smallest, then the cold hydrogen between the lining barrel 76 and the reactor body 71 will flow due to the reduced pressure near the first gas hole 83 and the second gas hole 84, thereby ensuring the formation of disturbance at the second annular passage 81 by the flow of the cold hydrogen, and accelerating the mixing of materials and cold hydrogen.

The working process of the suspension-bed reactor is as follows: the materials (such as liquid oil products, solid catalyst and hydrogen dissolved in the oil products) enter the reactor body 71 via the feed inlet 74 and enter the lining barrel 76, the materials entering the lining barrel 76 mix with cold hydrogen which enters via the second circulating passage 81 after entering the first circulating passage 80 via the cold hydrogen inlet 73, or mix with the cold hydrogen introduced via the first gas hole 83 and the second gas hole 84; in the uprising process, via the plurality of second circulating passages 81 on the lining barrel 76, the materials in the lining barrel 76 mix with the cold hydrogen entering via the second circulating passage 81, finally, the materials flow into the lining barrel 76 and flow out via the reaction product outlet 72, thereby realizing even mixing of the reaction materials and cold hydrogen fluid, ensuring that the temperature of the materials in the lining barrel 76 is more uniform, reducing coking of materials due to local hot spots, ensuring that the catalyst in the reactor is in a fluidized state, and improving reaction efficiency; the cold hydrogen entering the reactor body 71 can form a layer of insulation fluid in the lining barrel 76 with the inner side wall of the reactor body 71, thereby preventing a small amount of materials from possible aggregation and coking between the lining barrel 76 and the inner side wall of the reactor body 71, preventing the insulated lining 87 from being damaged and falling off, enabling the wall temperature of the outer wall of the reactor body 71 to be lower than the temperature of the materials in the reactor, avoiding corrosion to the outer wall of the reactor body 71, and reducing the requirement on the materials of the reactor.

Comparative Example 1

The comparative example is a method for producing high-quality fuel oil by utilizing heavy oil hydrocracking disclosed in Chinese patent document CN104388117A, and for the specific contents, please refer to paragraph 29 of the description.

Evaluation of Technological Effects

The raw oil conversion rate, yield of light oil and coking rate of the processes in the above Embodiments 3, 8, 9 and 10 and comparative example 1 are calculated based on the following formula for evaluation of process effects, and the results are shown in Table 5.

Conversion rate of raw oil=mass of components collected at a temperature of less than 524° C. (including gas)/mass of raw oil×100%;

Yield of light oil=mass of a fraction collected at a temperature of less than 350° C./mass of raw oil×100%;

Coking rate=mass of toluene insolubles/mass of raw oil×100%;

Yield of wax oil=mass of a fraction collected at a temperature of greater than 350° C. and less than 524° C./mass of raw oil×100%.

TABLE 5

|  | Conversion rate of raw oil/wt % | Yield of light oil/wt % | Yield of wax oil/wt % | Coking rate/wt % |
| --- | --- | --- | --- | --- |
| Embodiment 3 | 94.8 | 60.2 | 34.2 | 1.53 |
| Embodiment 8 | 95.4 | 65.7 | 29.3 | 1.37 |
| Embodiment 9 | 97.7 | 67.6 | 27.1 | 1.08 |
| Embodiment 10 | 98.8 | 70.8 | 25.1 | 1.67 |
| Comparative example 1 | 90.2 | 55.6 | 28.4 | 5.25 |

The quality of light oil prepared by the processes in the above Embodiments 8-10 and comparative example 1 is as shown in FIG. 6:

TABLE 6

| Quality of Light Oil | | | | |
| --- | --- | --- | --- | --- |
|  | Light oil products | Density (20° C., g/cm³) | Octane number | Cetane number |
| Embodiment 8 | Gasoline | 0.735 | 62 | — |
|  | Diesel | 0.815 | — | 49 |
| Embodiment 9 | Gasoline | 0.716 | 57 | — |
|  | Diesel | 0.823 | — | 59 |
| Embodiment 10 | Gasoline | 0.728 | 67 | — |
|  | Diesel | 0.817 | — | 47 |
| Comparative example 1 | Gasoline | 0.730 | 57 | — |
|  | Diesel | 0.834 | — | 49 |

The yield and quality of asphalt prepared by the processes in the above Embodiments 8-10 and comparative example 1 are as shown in FIG. 7:

TABLE 7

| Yield and Quality of Asphalt | | | | |
| --- | --- | --- | --- | --- |
|  | Penetration Degree | Ductility (cm) | Softening point (° C.) | Yield (%) |
| Embodiment 8 | 92 | 49 | 44 | 3.1 |
| Embodiment 9 | 88 | 44 | 47 | 4.0 |
| Embodiment 10 | 86 | 42 | 48 | 3.5 |
| Comparative example 1 | 95 | 53 | 42 | 13.1 |

Obviously, the above embodiments are merely examples for clear description, rather than a limitation to the implementation. For those skilled in the art, modifications or variations in different forms can be made based on the above description. Herein, there's no need to describe all the examples, and it's also impossible, while the apparent modifications or variations derived herein all fall into the protection scope of the present invention.

The invention claimed is:

1. A method for lightening heavy oil by utilizing a suspension-bed hydrogenation process, comprising the following steps:
   mixing a part of a raw oil with a suspension-bed hydrocracking catalyst to form a first mixture, carrying out first shear and second shear in sequence on the first mixture to obtain a catalyst slurry;
   mixing the catalyst slurry with remaining raw oil and hydrogen to form a second mixture and feeding the second mixture into a suspension-bed hydrogenation reactor for undergoing hydrocracking reaction at a pressure of 18-22.5 MPa, a temperature of 390-460° C. and a volume ratio of hydrogen to oil being 800-1500 to obtain a hydrocracked product; and
   subjecting the hydrocracked product obtained in the mixing step to a hot high pressure separation to obtain a gas stream and an oil stream;
   subjecting the gas stream obtained from the hot high pressure separation to a cold high pressure separation and a cold low pressure separation in sequence to obtain an oil stream,
   subjecting the oil stream obtained from the hot high pressure separation to a hot low pressure separation to obtain a gas stream and an oil stream, subjecting the gas stream obtained from the hot low pressure separation and the oil stream obtained from the cold low pressure separation to stripping separation to obtain dry gas, naphtha and bottom oil; and subjecting the oil stream obtained from the hot low pressure separation to vacuum distillation to obtain a first sidestream oil at a first sidestream line and a second sidestream oil at a second sidestream line, and feeding the first sidestream oil, the second sidestream oil and the bottom oil into a fixed-bed hydrogenation reactor for undergoing hydrotreatment again to obtain a hydrogenated product which is then subjected to separation to obtain a light oil of less than 350° C., wherein, the suspension-bed hydrocracking catalyst comprises a composite support and an active metal oxide loaded on the composite support, wherein the composite support consists of a semi-coke pore-enlarging material, a molecular sieve and a spent catalytic cracking catalyst at a mass ratio of (1-5):(2-4):(0.5-5), and the suspension-bed hydrocracking catalyst accounts for 0.1-10 wt. % of the catalyst slurry.

2. The method of claim 1, wherein the suspension-bed hydrocracking catalyst has a particle size of 5 μm to 500 μm.

3. The process of claim 1, wherein a mass ratio of the composite support to the active metal contained in the active metal oxide is 100:(0.5-10), wherein:
the active metal is selected from Group VIII metal and/or Group VIB metal;
the semi-coke pore-enlarging material has a specific surface area of 150-300 m$^2$/g and an average pore size of 70-80 nm;
the molecular sieve has a specific surface area of 200-300 m$^2$/g and an average pore size of 5-10 nm; and
the spent catalytic cracking catalyst has a specific surface area of 50-300 m$^2$/g and an average pore size of 3-7 nm.

4. The process of claim 3, wherein the spent catalytic cracking catalyst comprises the following components in parts by weight:

| | |
|---|---|
| Y-type molecular sieve | 15-55 parts |
| aluminum oxide | 15-55 parts |
| at least one of nickel, vanadium or iron | 0.5-1 part. |

5. The method of claim 1, wherein the raw oil is oil which is subjected to purification treatment, and the purification treatment comprises the following steps:
contacting the raw oil with an adsorbent which is in a fluidized state to produce an adsorption effect, and collecting a liquid phase after adsorption, wherein the adsorbent is semi-coke and/or kaolin.

6. The method of claim 5, wherein the adsorption effect is performed at a temperature of 50-100° C. and a pressure of 0-1.0 MPa, a mass ratio of the raw oil to the adsorbent is 1:(0.05-0.2), the semi-coke has a specific surface area of 100-500 m$^2$/g, and the kaolin has a specific surface area of 50-200 m$^2$/g.

7. The method of claim 1, wherein the suspension-bed hydrogenation reactor comprises a first reactor and a second reactor connected in series, wherein the first reactor is a suspension-bed hydrocracking reactor and the second reactor is a suspension-bed hydrogenation stabilizing reactor, and an operating temperature in the suspension-bed hydrogenation stabilizing reactor is lower than that in the suspension-bed hydrocracking reactor by 20-50° C.

8. The method of claim 7, wherein the catalyst slurry is mixed with the remaining raw oil and hydrogen to form a second mixture and then feeding the second mixture into the suspension-bed hydrocracking reactor for undergoing hydrocracking reaction to obtain a hydrocracked product; then the hydrocracked product is fed into the suspension-bed hydrogenation stabilizing reactor for hydrofining in the presence of a suspension-bed hydrogenation stabilizing catalyst to form a hydrofined product;
the suspension-bed hydrogenation stabilizing catalyst is a supported catalyst which comprises aluminum oxide as a supporter loaded with hydrogenation active metal selected from Group VIII metal and/or Group VIB metal.

9. The method of claim 1, wherein in step (4), the oil stream obtained from the hot low pressure separation is firstly subjected to distillation under normal pressure to obtain a first fraction collected at a temperature of 150° C.-250° C. and a second fraction collected at a temperature of greater than 250° C.; the second fraction is heated and is subjected to the vacuum distillation; and the first fraction is combined with the naphtha.

10. The process of claim 1, wherein a third sidestream oil is obtained at a third sidestream line of the vacuum distillation,
80-90 wt % of the third sidestream oil is combined with 5-20 wt % of the second sidestream oil to serve as a washing liquid for the third sidestream line,
the remaining 10-20 wt % of the third sidestream oil serves as a washing liquid for washing the oil stream and gas stream from the hot low pressure separation producing a washed gas stream and a waste mixture consisting of the washing liquid and the oil stream generated from the hot low pressure separation, and 30-90 wt % of the waste mixture is recycled for servings as a washing liquid for the hot low pressure separation;
the third sidestream oil has a distillation range consistent with the operating temperature of the hot low pressure separation.

11. The method of claim 1, wherein
the hot high pressure separation is carried out at a pressure of 18-22.5 MPa and a temperature of 350-460° C.;
the cold high pressure separation is carried out at a pressure of 18-22.5 MPa and a temperature of 30-60° C.;
the cold low pressure separation is carried out at a pressure of 0.5-1.5 MPa and a temperature of 30-60° C.;
the hot low pressure separation is carried out at a pressure of 0.5-1.5 MPa and a temperature of 350-430° C.;
the stripping separation is carried out at a temperature of 80-90° C.;
the first sidestream line of the vacuum distillation is operated at a temperature of 110-210° C., and the second sidestream line is operated at a temperature of 200-300° C.;
the fixed-bed hydrogenation reactor has an operating pressure of 18-22.5 MPa, a temperature of 360-420° C., a volume ratio of hydrogen to oil being 500-1500 and a volume space velocity of 0.5-1.5 h$^{-1}$.

12. The method of claim 1, wherein the gas stream obtained from the cold high pressure separation is used as recycle hydrogen, and the oil stream obtained from the cold high pressure separation is subjected to the cold low pressure separation to obtain a gas stream which is then mixed with the dry gas to serve as fuel gas.

13. The method of claim 1, wherein
the suspension-bed hydrogenation reactor is connected with a drainage system which comprises a drain pipeline, a cooling and separating system, a flare system and a raw oil recycling system, wherein one end of the drain pipeline is connected with the bottom of the suspension-bed hydrogenation reactor, and the other end of the drain pipeline is connected with the cooling and separating system;

when the temperature of the suspension-bed hydrogenation reactor instantly rises and exceeds a normal reaction temperature, a feed valve of the suspension-bed hydrogenation reactor is closed and drain valve bank in the cooling and separating system is opened, such that materials in the suspension-bed hydrogenation reactor are depressurized to 0.6-1.0 MPa via a decompression orifice plate arranged on the drain pipeline, and then discharged into the cooling and separating system for cooling and separating to obtain a gas-phase material and a liquid-solid two-phase material, and then the gas-phase material is discharged into the flare system, and the liquid-solid two-phase material is conveyed to the raw oil recycling system, thereby realizing emergency drainage of the suspension-bed hydrogenation reactor.

14. The method of claim 13, wherein when the temperature of the suspension-bed hydrogenation reactor instantly rises and exceeds a normal reaction temperature, a feed valve of the suspension-bed hydrogenation reactor is closed and drain valve bank in the cooling and separating system is opened, the materials in the suspension-bed hydrogenation reactor firstly enter a drainage tank of the cooling and separating system to be mixed with the flushing oil in the drainage tank for cooling to obtain a cooled liquid-solid two-phase material and a cooled gas material, wherein the cooled liquid-solid two-phase material is discharged into the raw oil recycling system via a blow-down pipeline which is connected to the bottom of the drainage tank; and the cooled gas material enters an emergency gas discharge air cooler via a gas discharge pipeline connected to the top of the drainage tank for undergoing cooling and liquid separation to obtain a gas-phase material and a liquid-phase material, wherein the gas-phase material is fed into the flare system, and the liquid-phase material is sent back to the drainage tank and finally discharged to the raw oil recycling system, thereby ensuring emergency drainage of the suspension-bed hydrogenation reactor.

* * * * *